Dec. 29, 1959     H. J. B. HERBRUGGEN     2,918,711
FOUNDRY PLANT
Filed May 28, 1958     18 Sheets-Sheet 1
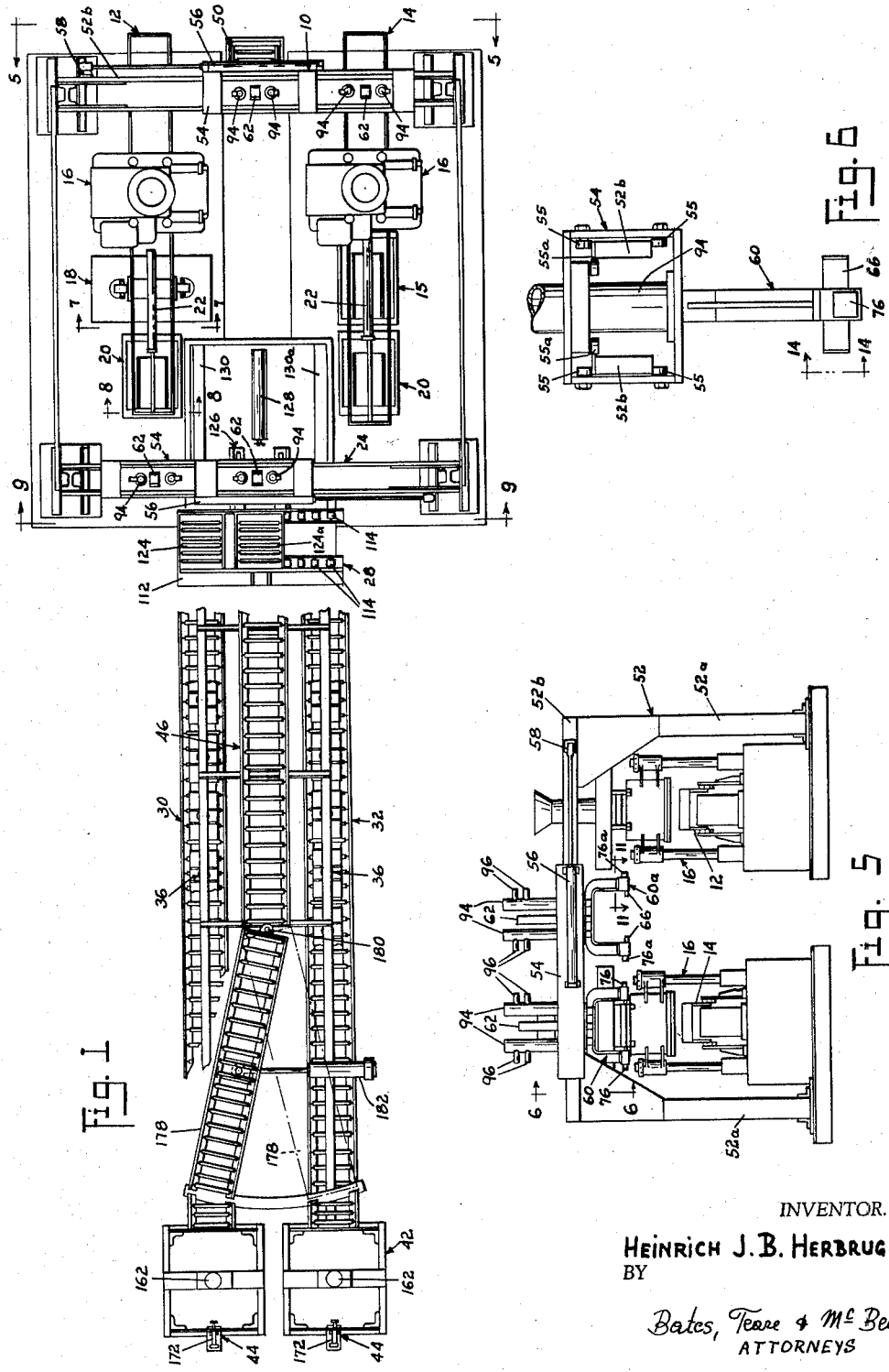
INVENTOR.
HEINRICH J. B. HERBRUGGEN
BY
Bates, Teare & M<sup>c</sup>Beau
ATTORNEYS

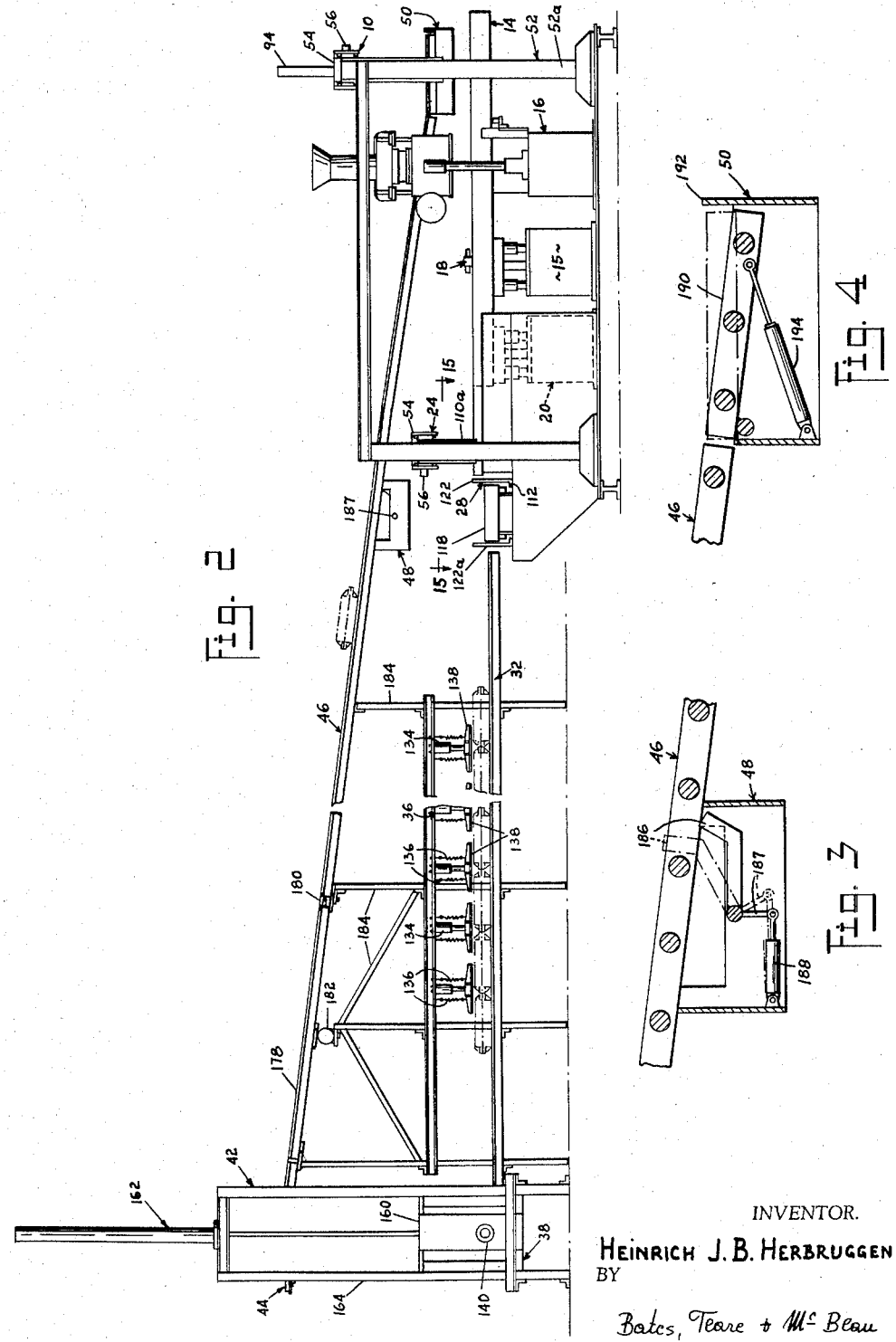

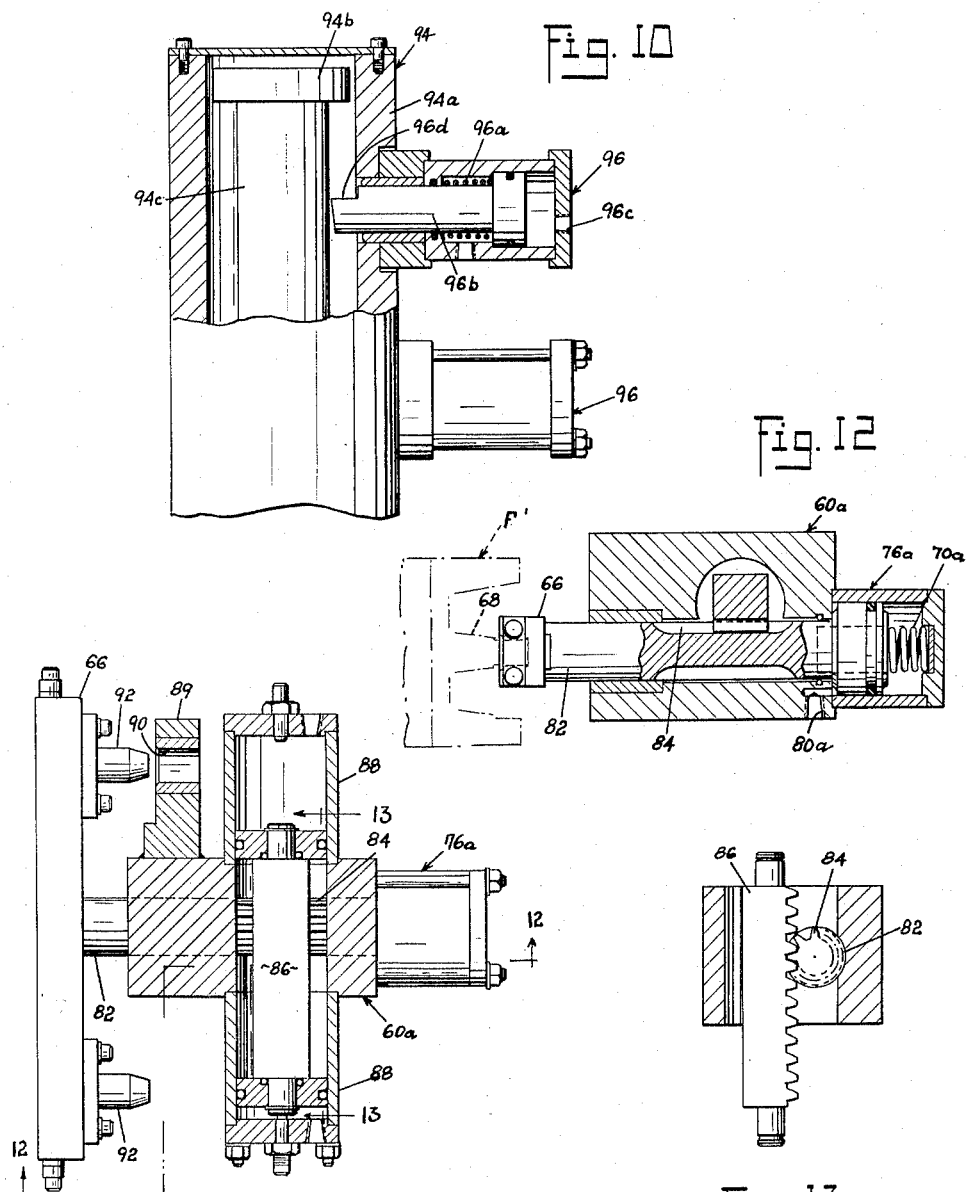

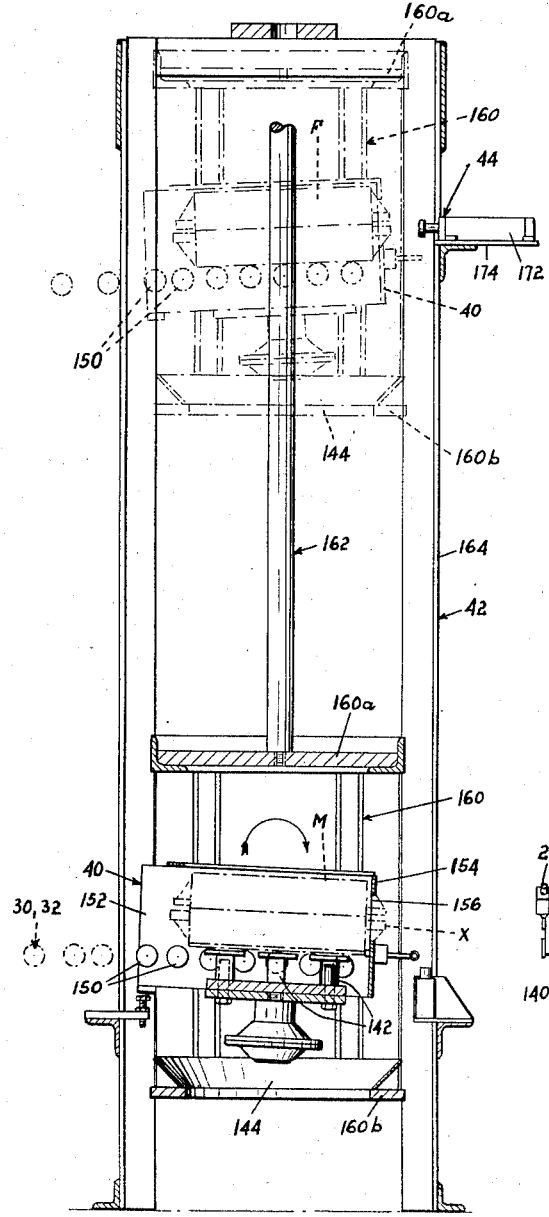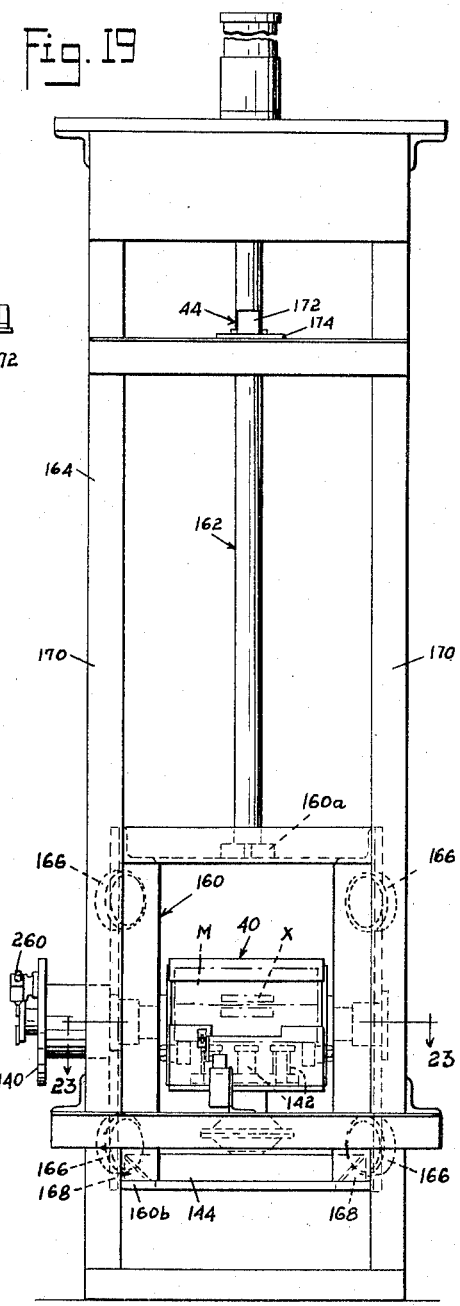

Dec. 29, 1959   H. J. B. HERBRUGGEN   2,918,711
FOUNDRY PLANT
Filed May 28, 1958   18 Sheets-Sheet 8
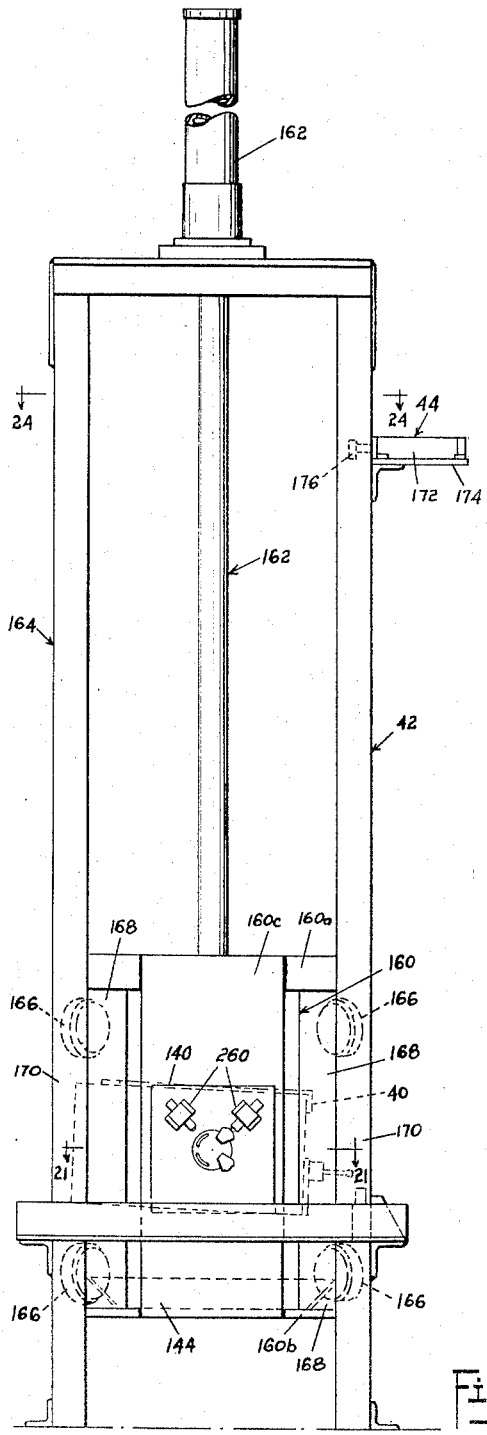
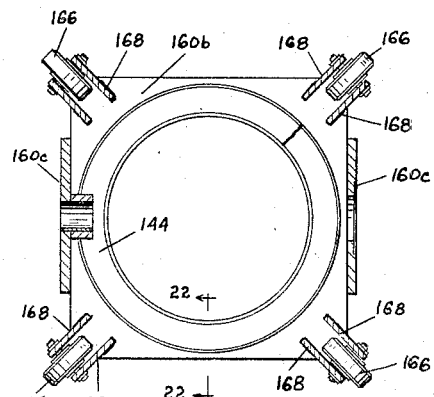
Fig. 21
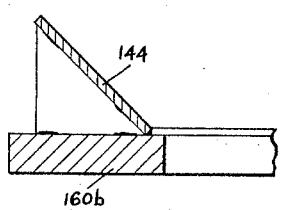
Fig. 22
Fig. 20
INVENTOR.
HEINRICH J.B. HERBRUGGEN
BY
Bates, Teare & McBean
ATTORNEYS Dec. 29, 1959   H. J. B. HERBRUGGEN   2,918,711
FOUNDRY PLANT
Filed May 28, 1958   18 Sheets-Sheet 9

INVENTOR.
HEINRICH J.B. HERBRUGGEN
BY
Bates, Teare & McBean
ATTORNEYS

Dec. 29, 1959   H. J. B. HERBRUGGEN   2,918,711
FOUNDRY PLANT

Filed May 28, 1958   18 Sheets-Sheet 10

INVENTOR.
HEINRICH J.B. HERBRUGGEN
BY
Bates, Teare & McBean
ATTORNEYS

INVENTOR.
HEINRICH J.B. HERBRUGGEN
BY Bates, Teare & McBean
ATTORNEYS

Dec. 29, 1959     H. J. B. HERBRUGGEN     2,918,711
FOUNDRY PLANT

Filed May 28, 1958                              18 Sheets-Sheet 15

INVENTOR.
HEINRICH J.B. HERBRUGGEN
BY
Bates, Teare & McBean
ATTORNEYS

FOUNDRY PLANT

Heinrich J. B. Herbruggen, Cleveland, Ohio, assignor, by mesne assignments, to Pettibone Mulliken Corporation, a corporation of Delaware Application May 28, 1958, Serial No. 738,499

12 Claims. (Cl. 22—20)

The present invention relates in general to foundry plants generally continuous in character and adapted for the rapid and effective handling of mold flasks and the efficient mass-production of sand molds and resultant castings therefrom, all of the latter characteristics being provided for by a relatively uninterrupted system utilizing a minimum of floor space and operating personnel.

Known types of continuous casting producing plants usually occupy considerable space, especially in a longitudinal direction, because of the relatively great number of flasks and associated molds that have to be handled, worked upon and stored during the molding, pouring, shake-out and flask returning operations of the plant. In an attempt to accommodate an automatic plant arrangement into limited space, power driven, continuously moving, endless conveyor lines are being used. Such continuously moving conveyor lines possess various disadvantages which include the generally necessary requirement of performing the pouring operation while the molds are advancing on the continuously moving lines. In addition, the mechanical components of such lines are subject to a high rate of wear and breakdown under the influence of sand, dirt, dust, etc. usually found in foundry operations. Furthermore, the initial installation expense of such lines is of considerable magnitude, and generally excessive in comparison with the results obtained. Moreover, the problems connected with tieing the generally step-wise operations of the mold forming and handling stations into a continuously moving conveyor mechanism are complex, resulting in unduly complicated and expensive control mechanisms and apparatus, which again results in increased installation and operating expense.

The present invention provides an improved molding plant arrangement which may be readily and automatically controlled in an expeditious manner, which can be installed in a relatively limited space, and which is substantially free from the necessity of manual labor for operation thereof. The plant arrangement is capable of performing all of the related functions and operations required to produce castings from the initial forming of the molds to the shanking out or pushing out of the poured molds from their associated flasks and the automatic return of the latter to the molding station for reuse.

The molding plant or system of the invention may comprise:

(a) A loading station including clamping mechanism for taking the empty flasks from a return conveyor system and depositing them in operable and predetermined positions on a flask transporting mechanism, which may comprise a pair of shuttle bar elements;

(b) A mold blower and squeezing machine or device for forming the cope and drag sections of the mold proper;

(c) A drag section turnover or roll-over machine or device for inverting the drag section of a mold so that the mold cavity in the drag section faces upwardly;

(d) An inspection and coring station including a machine or device for physically lifting the flask and associated mold from the transporting apparatus or shuttle bars for inspection of the mold and insertion of any cores therein;

(e) An unloading and mold closing station including clamping mechanism for removing the cope and drag sections of the flasks and associated molds from the aforementioned shuttle bar mechanism and assembling such cope and drag flask and mold sections into a complete flask and mold assembly;

(f) A transfer station or unit for moving the completed flask and mold assemblies onto a transport mechanism in the form of a feed conveyor unit and then moving the assemblies to a pouring station where molten metal is introduced into the mold cavities;

(g) A mold clamping apparatus at the pouring station for holding the metal-filled molds and flask assemblies against the pressure of the gas and the molten metal until solidification of the latter occurs;

(h) A mold push-out or ejector station including a rotatable carriage or cage device where the flask and mold assemblies are automatically inverted and the solidified castings and the molding sand are pushed-out from the flask sections;

(i) An elevator mechanism for raising the rotatable carriage and supported empty flask assemblies to an upper level;

(j) Transfer mechanism for moving the empty flask assemblies from the carriage or cage onto the aforementioned return conveyor system disposed in generally vertically spaced relation to the aforementioned feeding conveyor system, for returning the empty flasks to the loading station, wherein they are once more progressed through the plant arrangement, the latter being supported on substantially a common base;

(k) And means for generally automatically controlling the above mechanism and apparatus in a coordinated, systematic, manner for generally sequential operation thereof to provide a substantially uninterrupted foundry plant arrangement for the mass production of sand molds and castings.

Accordingly, an object of the invention is to provide an improved foundry plant arrangement capable of effectively and efficiently performing all of the related operations and functions in the production of castings from the initial forming of the sand molds to the shaking or pushing out of the poured molds from the associated flasks and return of the latter to the mold forming station, all of said plant arrangement occupying a minimum of floor space and requiring a minimum amount of manual labor for operation thereof.

Another object of the invention is to provide a substantially completely automatic molding plant arrangement of the above mentioned type which eliminates the use of the above discussed chain-like, continuously moving conveyors, thereby overcoming some of the major difficulties inherent in existing automatic molding plants incorporating such continuously moving conveyors, and which comprises fluid actuated motor units which are preferably electrically controlled for automatic moving of the flasks and/or molds in a generally step-by-step fashion through the various work stations of the plant set up, whereby work operations can be efficiently performed on such flasks and molds when in non-moving condition.

Another object of the invention is to provide an improved automatic molding plant arrangement operating in step-by-step fashion which effectively produces the cope and drag portions of a mold, handles the latter for ready inspection and insertion of the necessary core elements, assembles the cope and drag portions, feeds the complete mold assembly to a pouring station whereat the pouring of molten metal is effected on a plurality of such mold assemblies in non-moving condition, feeds the mold assemblies to a shank-out or push-out station where the solidified metal castings and molding sand are effectively discharged from the associated flask and then returns the empty flasks as an assembly to a flask handling station by a return conveyor system disposed in a plane spaced vertically from the feeding path of the molds to the pouring and push-out stations, and then automatically places the empty flask sections back in proper position for again passing through the various work stations of the molding plant, the latter being usable in a minimum floor space arrangement and requiring a minimum amount of manual labor for proper operation thereof.

Another object of the invention is to provide an automatic molding plant arrangement of the above discussed type which will substantially reduce the cost of producing sand molds and their associated castings, thereby resulting in obvious economic advantages as compared to existing molding plant arrangements.

Other features and advantages of the invention will be apparent from the consideration of the following description taken in conjunction with the accompanying drawings wherein:

Fig. 1 is a broken top plan view of one form of the apparatus constructed in accordance with the invention.

Fig. 2 is a side elevational view of the apparatus of Fig. 1.

Fig. 3 is an enlarged, fragmentary, vertical sectional view of the stop mechanism on the return conveyor system which holds the empty flasks coming from the push-out station, in stationary position until the loading station at the forward end or head of the molding plant apparatus is ready to receive the flasks for further handling.

Fig. 4 is an enlarged, fragmentary, vertical sectional view of the tilt mechanism at the above-mentioned loading station at the head end of the plant apparatus, for stopping the flask in proper position for transference to the mold forming station of the apparatus.

Fig. 5 is an end elevational view of the molding plant apparatus taken substantially along line 5—5 of Fig. 1, looking in the direction of the arrows, and illustrating in particular, the loading station and associated clamping mechanism of the plant arrangement.

Fig. 6 is a fragmentary, enlarged end view of one of the clamping mechanisms and its mounting arrangement, of the above mentioned loading station, taken substantially alone line 6—6 of Fig. 5 looking in the direction of the arrows, and with parts of the loading station mechanism being eliminated in the interests of clarity.

Fig. 10 is a fragmentary, partially sectional view of a fluid operated stop mechanism for limiting the downward movement of the piston elements of the fluid operated motor units which raise and lower the clamping apparatus of the loading and the unloading stations to transfer the flask assembly either to or from the shuttle bar or transport apparatus of the plant assembly.

Fig. 11 is a horizontal sectional view taken substantially along line 11—11 of Fig. 5, looking in the direction of the arrows and illustrating the clamping mechanism of the type adapted for rotary movement so as to invert or turn upside down the drag section of the flask assembly, preparatory to the mold blowing operation.

Fig. 12 is a vertical, partially sectioned view taken substantially along line 12—12 of Fig. 11, a portion of an associated, clamped flask being illustrated in dot-dash lines.

Fig. 13 is a fragmentary sectional view taken substantially along line 13—13 of Fig. 11 looking in the direction of the arrows and illustrating the rack and pinion mechanism for accomplishing the rotary movement of the flask clamp.

Fig. 18 is a vertical sectional view of one of the mold shake-out or push-out stations with the associated mechanism for accomplishing the desired result including the turnover cage, and the elevator apparatus for lifting the empty flask assemblies to a plane in vertically spaced relation to the plane of the feed conveyors of the plant arrangement.

Fig. 19 is an end elevation taken from the right-hand side of Fig. 18.

Fig. 20 is a side elevation taken from the left hand side of Fig. 19.

Fig. 21 is a horizontal, sectional view taken substantially along the plane of line 21—21 of Fig. 20 looking in the direction of the arrows and with the turnover cage removed to better illustrate the lower portion of the elevator car.

Fig. 22 is a fragmentary vertical view taken substantially along lines 22—22 of Fig. 21 looking in the direction of the arrows.

Figure 27:
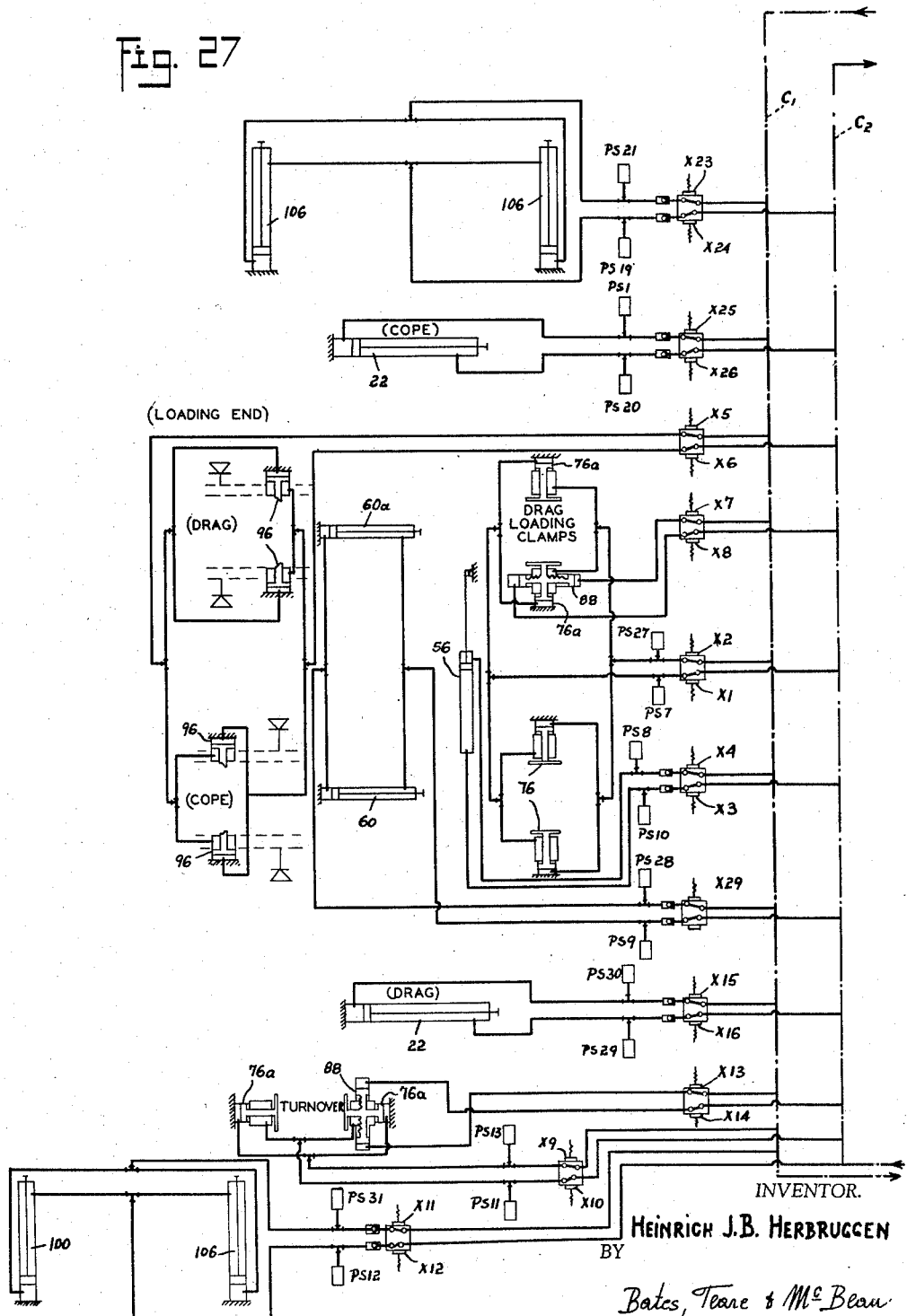
Figs. 27, 28 and 29 illustrate a fluid operating system for the plant exclusive of the mold push-out or ejector mechanism; the three views together represent the complete control system.
Figure 28:
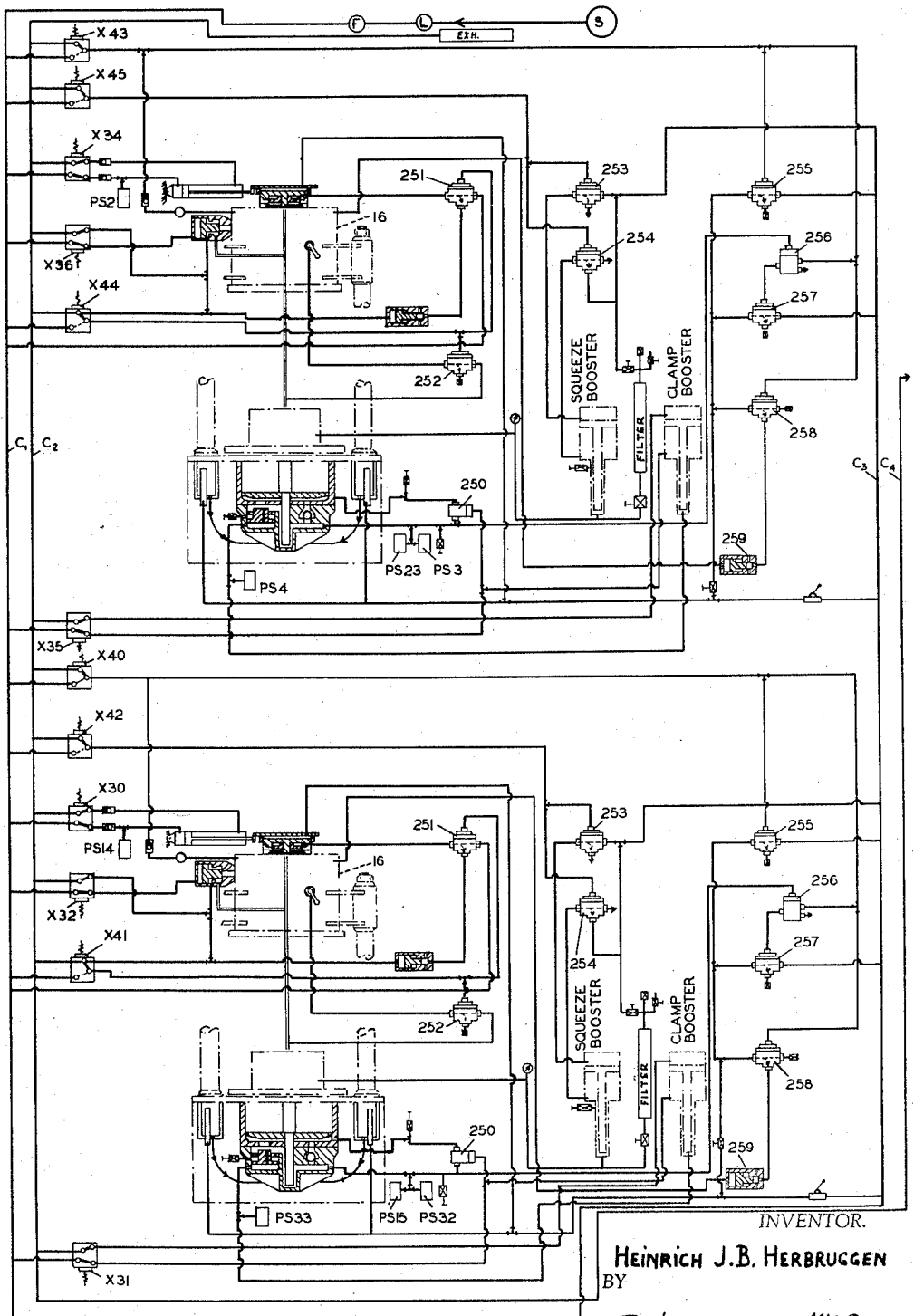
Figure 29:
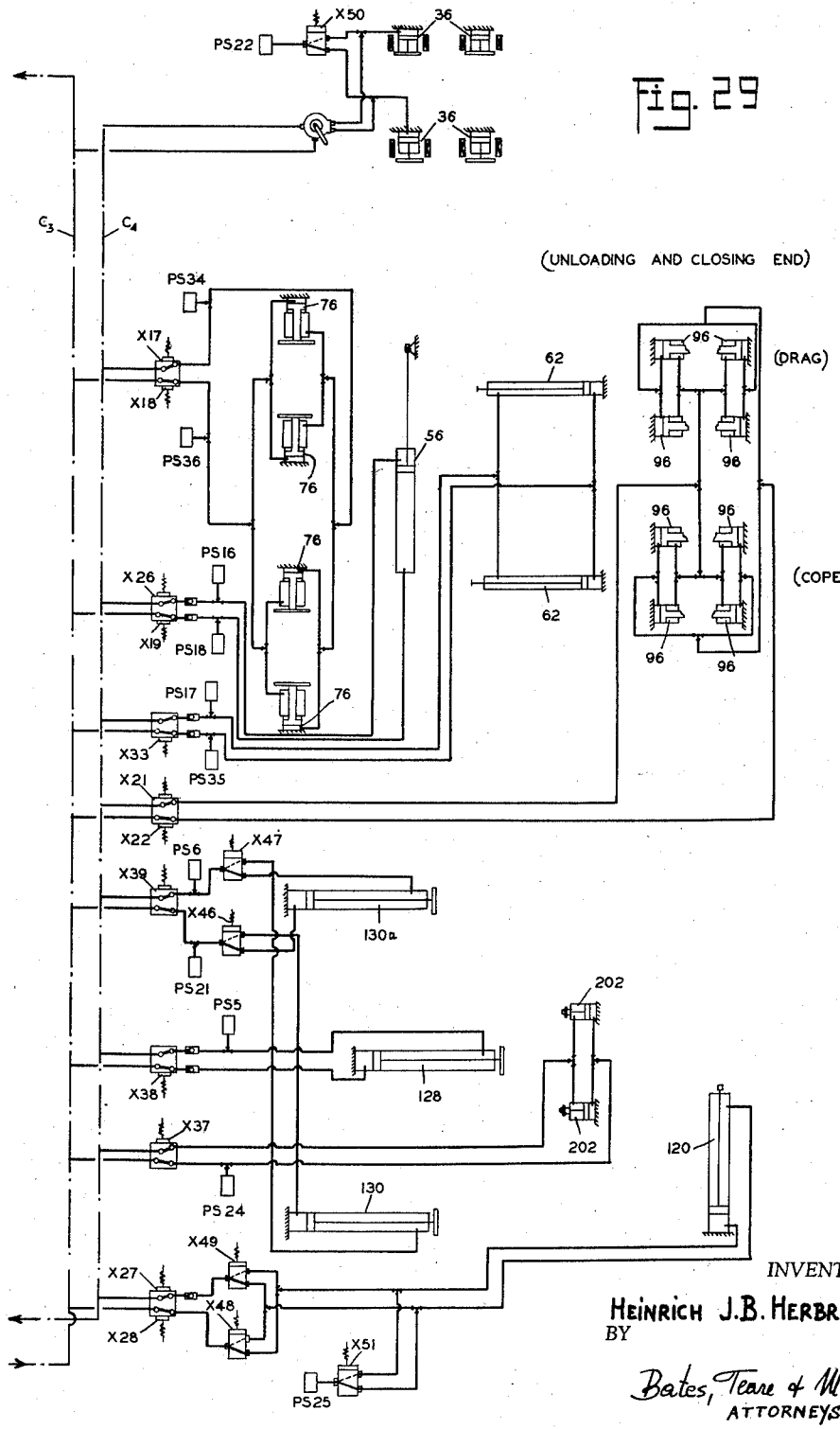
Figure 30:
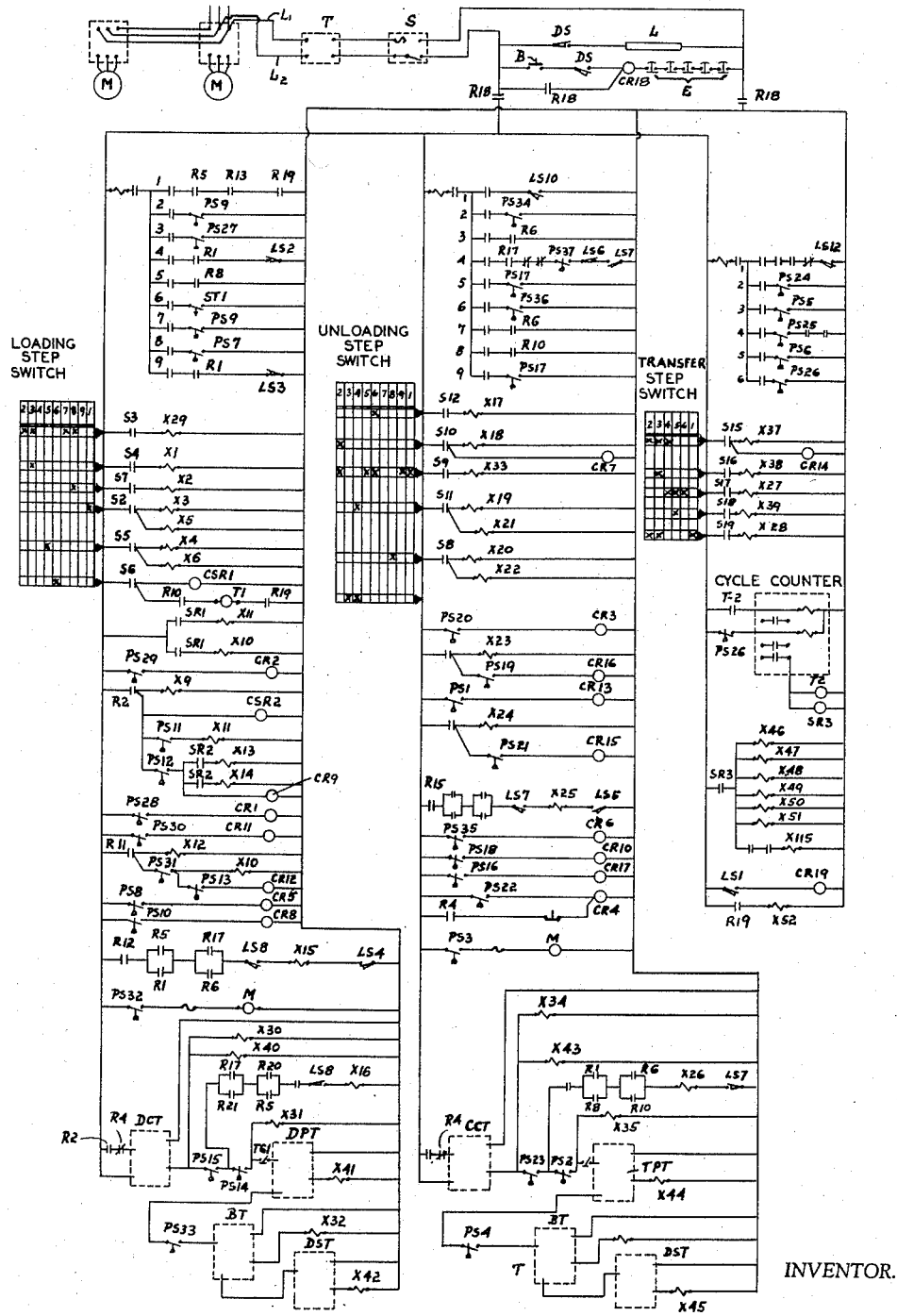
Figure 31:
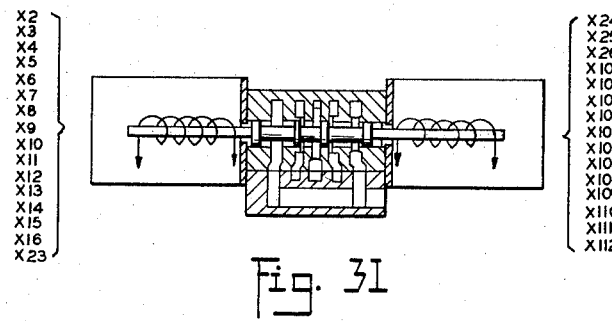
Figure 32:
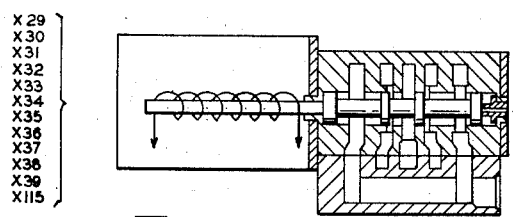
Figure 33:
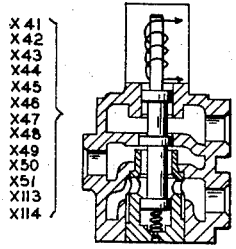
Figure 34:
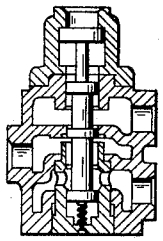
Figure 35:
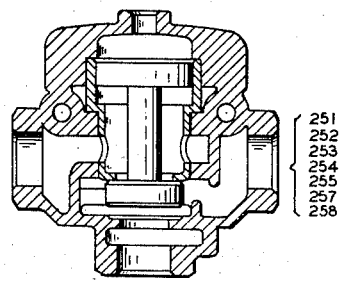

Fig. 30 schematically illustrates a control circuit for the operating system of Figs. 27, 28 and 29.

Figs. 31 through 35 inclusive diagrammatically and schematically illustrate the internal operating structures of various valves employed in the operating system of Figs. 27, 28 and 29.

Figure 36:
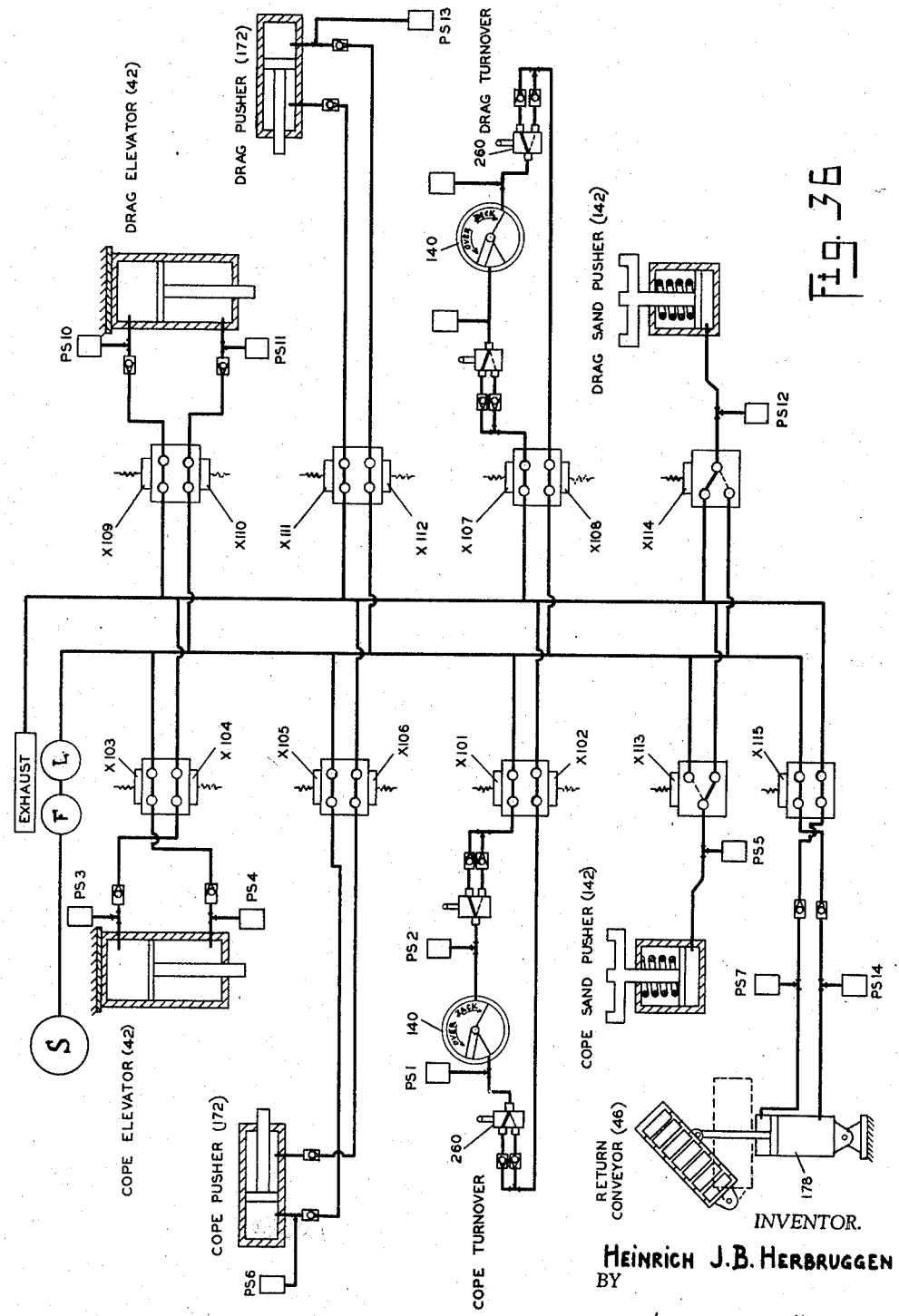

Fig. 36 diagrammatically illustrates a fluid operating system for the mold ejector apparatus, this system coacting with the system of Figs. 27, 28 and 29 in the automatic cycle of operation.

Figure 37:
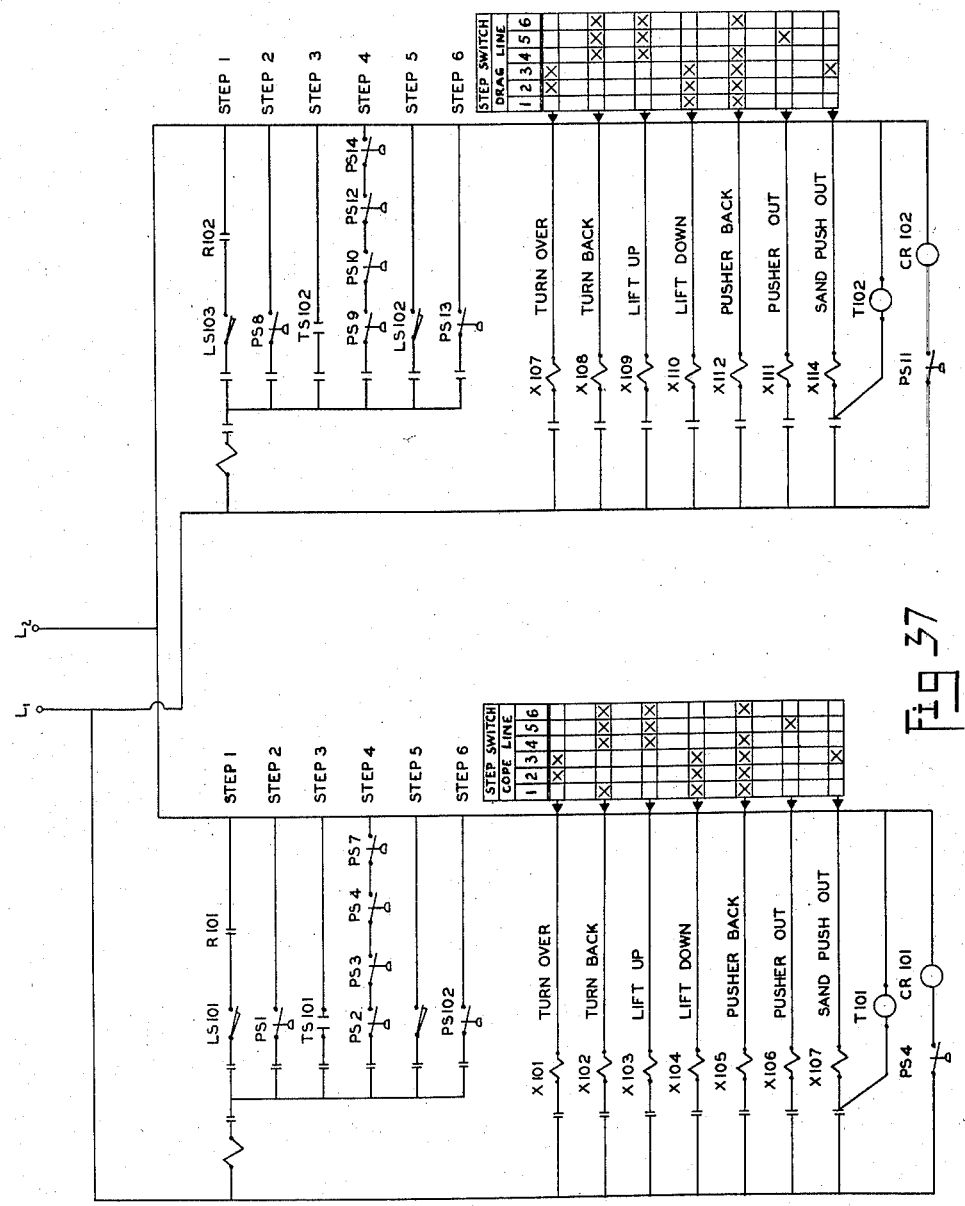

Fig. 37 schematically illustrates an electrical circuit for controlling the fluid operating system of Fig. 36.

Figure 38:
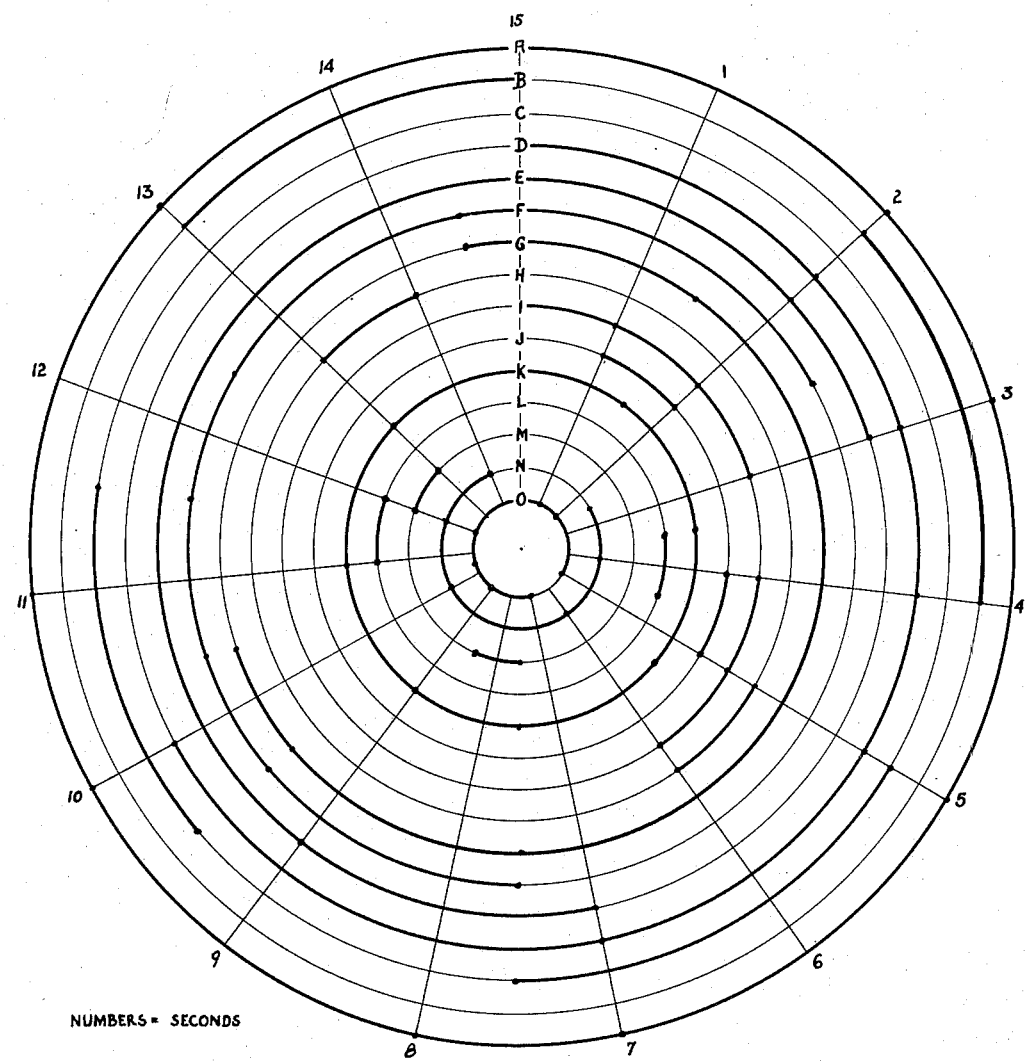

Fig. 38 is graphic representation illustrating the sequential operation of various components of the plant in a completely automatic cycle.

*General description*

Referring now in particular to Figs. 1 and 2 of the drawings, there is shown generally the plant apparatus for the mass production of sand molds and their associate castings in accordance with the invention. The apparatus generally embodies a flask clamping and loading or transfer station 10 and associated mechanism for placing empty flasks in proper and predetermined position on flask and mold transporting mechanisms or shuttle bar devices 12 and 14 disposed in generally transversely spaced and parallel relationship, as shown in Fig. 1. Disposed along the path of movement of transport apparatus 12 is what may be generally referred to as a mold forming station or area and which may include a mold and/or core blower and squeezer machine 16 of a well known type, for forming the mold proper in the flask; a turn-over or inverting machine or device 18 for taking the flask section and associated mold, lifting it from the transport apparatus 12 and inverting it or rolling it over so that the mold cavity will be faced upwardly, and an inspection and coring station 20 and associated mechanism for lifting the flask section and associated mold off the transporting mechanism 12 for inspection of the mold and insertion of any desired cores therein. The work stations and associated mechanism disposed along the path of travel of transport apparatus 14 are substantially the same as those along transport apparatus 12 with the exception that in the embodiment shown, there is no turn-over or roll-over device associated with transport apparatus 14. Apparatus 14 does, however, have a work station and associated mechanism 15 for raising the corresponding flask and mold section off the shuttle bars to enable progression of the mold along the path of travel of the shuttle bar mechanism. The reason that mechanism 14 has no turnover or rollover machine associated therewith is that transport apparatus 14 and associated work stations and work performing mechanisms are used, in the embodiment shown, for the production of cope sections of a complete mold, while the transport apparatus 12 and associated work stations and work performing mechanism are used for the purpose of forming drag sections for the fully complete molds. The drag sections of the flasks are raised up against a blow plate of blowing machine 16 and with a bottom pattern plate, during the formation of the mold proper, and the resultant mold cavity is therefore formed facing downwardly. Accordingly, the drag section has to be inverted to face upwardly for forming a complete mold assembly, as will be understood by those skilled in the art, and therefore the latter explains the necessity of turnover mechanism and the related operation, associated with the formation of the mold drag sections.

The transporting apparatus and associated work performing stations and mechanisms discussed above, per se, are well known and therefore a detailed description of such mechanism is not believed necessary here. As described in the above mentioned co-pending application, the transport mechanism comprises a pair of shuttle bar elements actuated by fluid powered units 22 for movement along a longitudinal path whereby movement of the bars will position each of the flasks and molds precisely in operative relation to a corresponding one of the work stations 16, 18, 15 or 20. While two separate transport or shuttle bar mechanisms are shown in side to side relation for the production of mold cope sections on mechanism or system 14 and mold drag sections on mechanism or system 12, it will be understood that only one transport mechanism or system could be used, with both cope and drag sections of a complete mold being formed at the work stations along the path of movement of such single transport apparatus, with only every other formed mold section (i.e. the drag section) being inverted by machine or device 18 for proper positioning of the mold sections to form a complete and operable molding assembly. In the latter instance, suitable control mechanism of any well known type could be utilized to cause operation of the turnover member 18 with respect to only every other flask section progressed therethrough.

Spaced generally forwardly with respect to the transport mechanisms 12 and 14 is an unloading and mold closing station 24 with associated clamping mechanism, for lifting the formed cope and drag mold sections off the corresponding transporting apparatus 12 or 14 and assembling them into a complete mold assembly. Associated with the unloading and mold closing station 24 is a triple transfer unit or mechanism 28 for moving the completed mold and flask assemblies to one or the other of a pair of feed conveyor or transport systems 30 and 32 disposed in generally transversely spaced, parallel relationship and extending in generally aligned relationship with the other parts of the foundry arrangement. Conveyors 30 and 32 are preferably of the well-known roller type and may be of any desired length for receiving a plurality or "train" of mold assemblies thereon for pouring operations. When the desired number of mold assemblies have been fed to one of the conveyor systems 30 or 32, clamping mechanism 36 is actuated and the pouring of molten metal into the mold cavities is effectively accomplished while the mold assemblies are in non-moving or stationary condition. While the pouring of molds on one of the feed conveyor systems 30 or 32 is being performed, the transfer unit 28 can be feeding mold assemblies to the other of the conveyor systems to thereby provide a very efficient and effective arrangement for the mass production and continual pouring of molds and their resultant castings. After completion of the pouring operation on the mold "train" on one of the feed conveyor systems, and the lapse of a sufficient time to permit substantial solidification of the molten metal in the mold cavities, the clamping mechanism 36 is manually actuated to remove the clamping action and the transfer unit 28 can again begin feeding unpoured molded assemblies to the conveyor on which the poured mold assemblies are resting. Heretofore, with continuously moving conveyor systems, the clamping of molds by fluid operated motor units was virtually impossible and individual weights were generally used as "pressure heads" for the poured mold assemblies, such weights traveling along at the same speed as the moving conveyor unit. With the present arrangement, a single valve may be used to control the entire clamping action of the mold clamping mechanism 36 to thereby considerably increase the efficiency of such operation and provide a self-acting interruption of the foundry plant production as long as the conveyor system supporting the poured mold assemblies is not ready to release the same and receive new unpoured molds. Upon removal of the clamping action of clamping mechanism 36, the transfer station or mechanism 28 feeds new molds to the conveyor system, with the result that the train of poured molds and associated solidified castings are moved forwardly so that they are successively pushed one at a time into the discharge station 38 and associated roll over cage or carriage member 40 where the mold assemblies are inverted and the castings and molding sand are pushed out of the assembled flask sections without separation of the latter, into a bin or onto a conveyor system (not shown) where the castings can be cleaned and further handled, and the sand removed for reclaiming purposes.

Upon emptying of the mold flask assembly, elevator mechanism 42 raises the cage 40 and empty flask assembly upwardly (the cage meanwhile being rotated so that the flask assembly is once more disposed in upright position) to transfer station 44, where the empty flask assemblies are fed or moved onto a return conveyor system 46 for return of the flasks to the loading station for reuse. In the embodiment shown, a pushout station 38, a roll over cage 40, an elevator mechanism or station 42 and a transfer station 44 is associated with each of the feed conveyor systems 30 and 32 respectively, but it will be understood that only one of the latter discharge and elevator arrangements could be arranged for use with both of the feed conveyor systems, 30 and 32, the latter arrangement merely meaning that the plant production would be slowed up somewhat.

Disposed in return conveyor system 46, in spaced relationship to transfer station or mechanism 44, is a stop station and associated mechanism 48, for holding or retaining the empty flask assemblies coming from the transfer station 44 until the loading station 10 at the forward end or head of the molding plant apparatus is ready to receive the flask sections for further handling. At the end of the return conveyor system 46 furthest from the transfer station or mechanism 44, there is disposed a stop and tilt station or mechanism 50 for stopping the flask assemblies in proper position for transfer to the mold forming station of the apparatus by the loading mechanism 10. Substantially all of the above described apparatus and mechanisms are preferably automatically operated and controlled by means of fluid actuated motor units controlled by suitable automatically actuated valves and electrical circuits, as will be hereinafter described in greater detail, to provide a foundry plant arrangement capable of generally automatically performing all of the related functions and operations required to produce castings from the initial forming of the molds to the shaking out or pushing out of the poured molds from their associated flasks and the automatic return of the latter to the molding station for reuse, and in a relatively uninterrupted system utilizing a minimum of floor space and operating personnel.

Loading station

The details of the loading station 10 are best illustrated by referring to Figs. 5, 6, and 10 to 14 inclusive of the drawings, in combination with Figs. 1 and 2.

Figure 26:
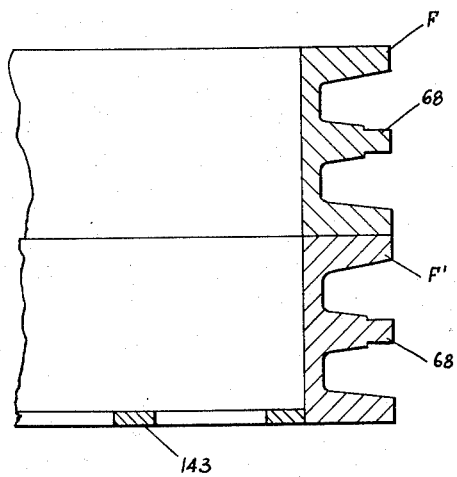
Fig. 26 is a fragmentary, vertical sectional view of a cope and drag flash assembly, and illustrating a portion of the grid or grate extending across the bottom of the drag flask section to aid in supporting the associated mold therein.

The loading apparatus of station 10, in the embodiment shown is supported on frame structure 52, comprising a pair of transversely spaced columns 52a connected adjacent their upper ends by cross elements 52b (Figs. 5 and 6). A transfer carriage member 54 is mounted for anti-frictional movement lengthwise of cross elements 52 by means of roller members 55 and 55a (Fig. 6). Rollers 55 prevent relative vertical movement of the carriage 54 with respect to the cross elements 52b, while rollers 55a prevent relative cross wise or lateral movement of the carriage with respect to the supporting cross elements 52b, while readily permitting transverse movement of the carriage with respect to the transport mechanisms 12 and 14. Movement of carriage 54 is accomplished by fluid actuated motor unit 56 (shown in the form of a double acting piston and cylinder unit) mounted on carriage 54 with one end thereof being secured to the supporting frame structure 52, as at 58 (Fig. 5). Mounted for vertical reciprocable movement on carriage 54 are a pair of clamping mechanisms or devices 60 and 60a respectively, with such vertical movement being accomplished by means of double acting piston and cylinder units 62 (Fig. 5). Clamping elements 60 and 60a are of generally inverted U-shaped configuration and comprise inwardly disposed, reciprocable jaw elements 66, which are adapted to clasp or clamp the empty cope and drag flask sections at tilt station 50, and deposit them in predetermined and operable positions on the respective one of transport mechanisms 12 and 14. When the emtpy flask assemblies arrive at the stop station 50 on the return conveyor system 46, they will be in the form of a cope section stacked on top of a drag section, the drag section preferably having plates or strips disposed in grid form across the bottom thereof, in a manner well-known to those skilled in the art, for better support of the mold therein, while the cope section is open at both the top and bottom thereof. The flask sections also comprise an intermediate flange 68 (Figs. 12 and 26) on each side thereof, adapted to be received in clasped relationship by the jaw elements 66 of clamping mechanisms 60 and 60a, for facilitating positive transfer of the flask sections to the transport mechanisms 12 and 14.

The cope sections of the flask assemblies presented by the return conveyors system 46 to the loading station 10 are adapted to be handled by clamping device 60 (Fig. 5). The clamping jaws 66 of device 60 are advanced inwardly towards one another into clamping position by a compression spring member 70 (Fig. 14) reacting between an abutment wall 72 and the piston element 74 of fluid actuated piston cylinder unit 76. Clamping jaws 66 are connected to the piston rod 78 of unit 76 and are adapted to be retracted from clamping relation with flange 68 on flask section F upon the introduction of fluid into port 80, which causes the piston 74 to move rearwardly in its associated cylinder, thereby separating jaw 66 from the flask section, after the latter is properly positioned on transport mechanism 14.

Clamping member mechanism 60a, in the embodiment shown, is adapted to handle the drag section of the empty flask assembly during loading of the latter on the transport mechanisms, and is adapted to rotate the drag section so as to present the bottom end thereof to the blow plate of the molding machine 16. Referring to Figs. 11 and 12 and 13, it will be seen that reciprocable movement of the clamping jaws 66 of clamping unit 60a is accomplished in substantially the same manner as for the aforesaid clamping unit 60 by means of compression springs 70a and fluid actuated piston and cylinder units 76a. However, the piston rod 82 of unit 76a has a portion thereof (in the embodiment shown the central portion thereof) formed in the manner of a pinion 84 adapted for coaction with rack element 86 for causing rotation of the piston rod 82 and corresponding clamping jaw 66, and thus cause rotation of the associated drag flask section $F^1$. The pinion teeth extend lengthwise of rod 82 a sufficient amount to provide for the above discussed axial movement of rod 82 for clamping and unclamping movement of associated jaws 66 thereof. Rack element 86 has a single acting, fluid actuated piston and cylinder unit 88 attached to each end thereof for causing reciprocation of the rack 86 and thus rotation of the jaw 66 and clamped flask section $F^1$. It will be understood that while both of the clamping jaw actuating units 76a of clamping devices 60a are shown to be of the rotary type, only one rotary type unit could be used to accomplish the desired result. Clamping device 60a has a laterally extending wing portion 89 having an opening 90 therein adapted to receive a tapered aligning pin 92 on rotatable jaw element 66 during outward or unclamping movement of the latter to insure positive aligned relationship between the clamping jaw 66 and the intermediate web or flange 68 on the sides of the flask section after each clamping, rotation, and unclamping operation of mechanism 60a.

Associated with each of lift cylinders 62, which move and adjust the position of the corresponding clamping devices 60 or 60a in a vertical direction with respect to the carriage member 54 is, in the embodiment shown, a pair of stop piston and cylinder units 94 (Figs. 5 and 10). Each of units 94 comprises a cylinder member 94a mounted on carriage member 54 with a piston element 94b disposed for free axial movement in cylinder 94a and connected by poston rod element 94c to the associated of the clamping devices 60 or 60a. It will be seen, therefore, that piston elements 94b are follower elements, merely moving in the direction of actuation of the associated actuating piston and cylinder unit 62. Disposed in vertically spaced relation along the side of each of cylinders 94a are a plurality of fluid actuated, stop units 96. A compression spring 96a resiliently urges the stop plunger member 96b of each of units 96 to retracted or inoperative position, while fluid pressure through port 96c is used to urge or move the plunger element 96b to extended or stopping position. In the embodiment shown, plunger element 96b is provided with a generally flat abutment surface 96d on the outer or free end thereof, adapted for engagement with the piston head 94b to limit the downward movement of the clamping devices 60 or 60a with respect to the carriage member. Thus it will be seen that the downward movement of the clamping devices 60, 60a with respect to the carriage 54, and with respect to the tilt station 50, at which the returning flask assemblies are stopped for transference to the transport mechanisms 12 and 14, may be very precisely controlled by the proper positioning of the stop units 96 on the cylinders 94a of stop mechanisms 94. Having one of units 94 disposed on either side of the actuating piston and cylinder units 62, provides a balanced stop arrangement for precise operation and control of the vertical movements of clamping mechanisms 60 and 60a. Actuating unit 62 may have a relief valve associated therewith, in a manner well known to those skilled in the art to prevent overloading of such units when stop plungers 96b limit the vertical movement of the clamping devices 60 and 60a. A more detailed description of such operational movements will hereinafter be presented.

*Mold forming station which includes sand blowing, turnover, and inspection-coring lift mechanisms, and transporting apparatus associated therewith*

Figure 7:
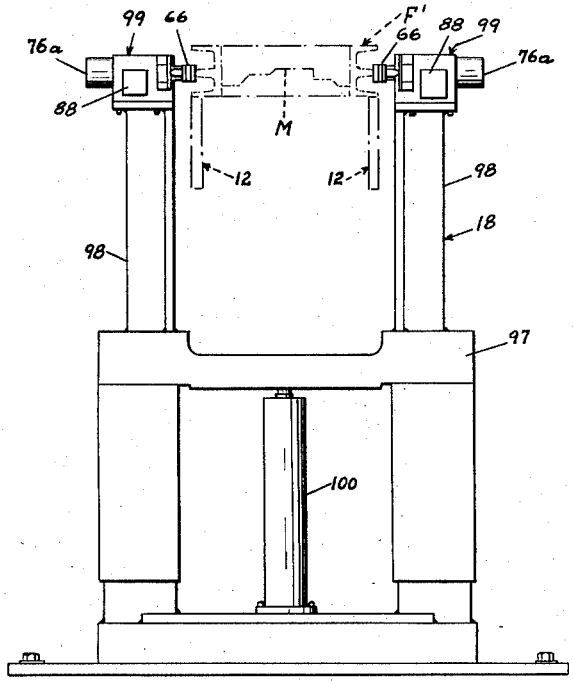
Fig. 7 is an enlarged view of a mechanism for inverting or turning over the drag portion of the flask assembly, the view being taken substantially along line 7—7 of Fig. 1.

The shuttle bar mechanism 12 is adapted to pass through the various work stations and associated mechanism disposed along the path of travel of the shuttle bars, such mechanisms including the turnover device 18 (Fig. 7). Device 18 embodies a base 97 and upright vertical arm portions or guides 98 which embody fluid actuated, transversely movable clamping mechanism 99, which are substantially similar to the clamping mechanisms of clamping device 60a, heretofore discussed in detail, and in particular with reference to Figs. 11, 12 and 13. A fluid actuated piston and cylinder unit 100 is adapted to lift or move turnover device 18 in a vertical direction, thereby lifting the drag flask section F¹ and associated mold previously engaged by clamping devices 99 thereof, upwardly off the shuttle bar or transport apparatus 12, and then rotate the flask and mold so as to face the mold cavity thereof upwardly. Arms 98 of device 18 are of sufficient height to insure that no interference occurs between shuttle bar mechanism 12 and the drag flask section during rotation of the latter by mechanism 99.

Figure 8:
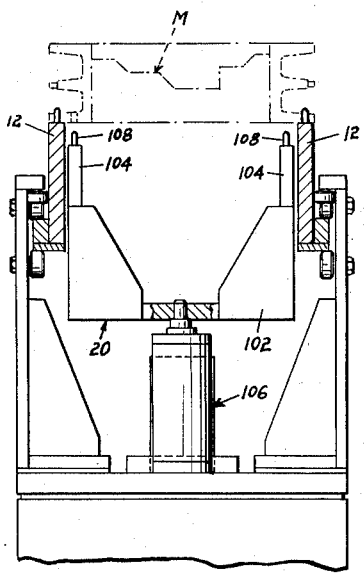
Fig. 8 is an enlarged partially sectional view of a mechanism or device for separating a flask and its associated mold from the transport or shuttle bar apparatus of the plant structure and is substantially taken along line 8—8 of Fig. 1 looking in the direction of the arrows.
Figure 14:
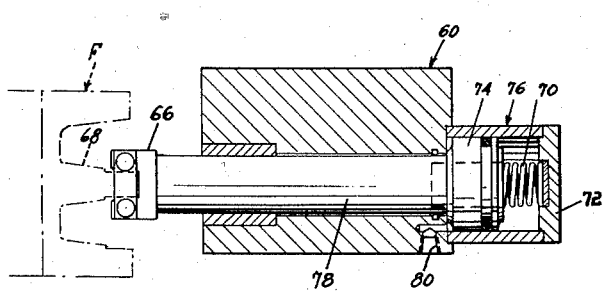
Fig. 14 is an enlarged sectional view looking substantially in the direction of the arrows of line 14—14 of Fig. 6 and illustrating the form of fluid actuated clamp for coaction with the flask members which is not adapted to be rotatable, but is adapted merely to have axial movement in the linear path of the bore of the associated cylinder.

Referring now to Fig. 8, the inspection and coring station 20 and associated lift mechanism thereof, in the embodiment shown, is disposed intermediate shuttle bar or transport mechanisms 12 or 14, and comprises a base 102 with upright arm elements 104 for lifting the flask section and associated mold M off the transport mechanism, for inspection of the mold and insertion of any cores therein. Mechanism 20 is actuated by fluid operated piston and cylinder 106. Arms 104 preferably embody tapered pins 108 adapted to be received in complementary openings in the flask section for positive alignment of the flask with respect to the inspection and coring station. The aforementioned lift structure or mechanism 15 associated with the cope transport mechanism 14 may also be substantially the same as that of mechanism 20, since as aforementioned it merely serves to lift the associated flask section and mold off the shuttle bars for progression of the flask and mold towards the unloading station and associated mechanism 24, during reciprocation of the shuttle bar apparatus 14.

*Unloading station and associated mechanism*

Figure 9:
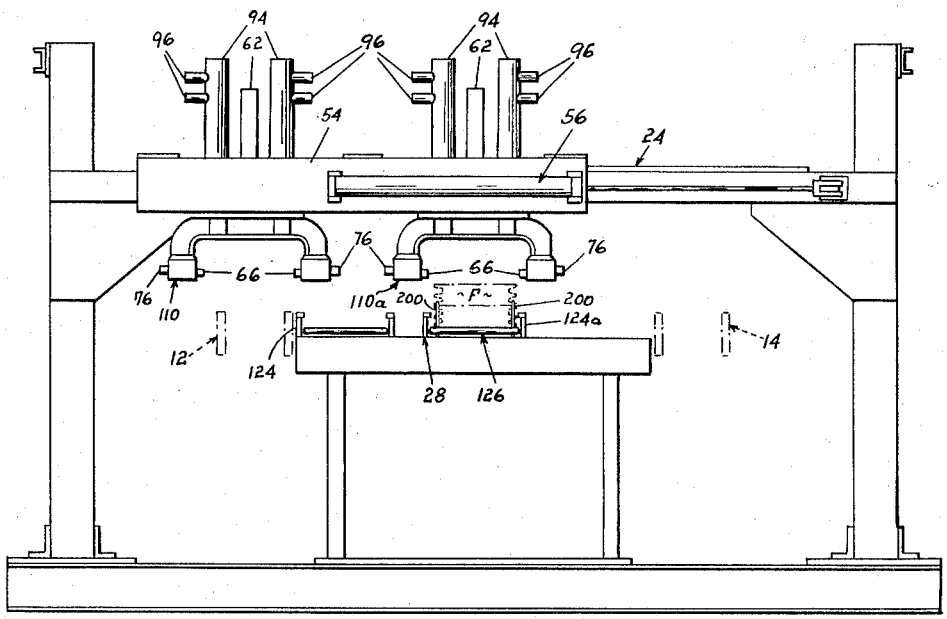
Fig. 9 is an enlarged, and elevational view of the clamping and unloading mechanism or station taken substantially along the plane of line 9—9 of Fig. 1 looking in the direction of the arrows.

Fig. 9 illustrates in more or less detail the unloading station 24 and associated clamping and transfer mechanism, for unloading the drag and cope flask sections and associated molds from the shuttle bar mechanisms 12 and 14, and assembling the flask sections into complete mold assemblies.

The clamping devices 110 and 110a and the other structure of unloading station 24 are substantially the same as that of loading station 10 with the exception that the fluid actuated piston and cylinder units thereof which reciprocate the clamping jaws 66 are merely operable in an axial direction, and are not adapted to cause rotation of the clamping jaws 66 thereof. In other words the actuating units of clamping mechanism 110, 110a are the same as those for clamping device 60 of the loading station 10 as was heretofore described with particular reference to Fig. 14. Clamping device 110 first takes a drag flask section and associated mold, with the mold cavity thereof facing upwardly, from the drag transport mechanism 12 and deposits it at the transfer station 28 upon the proper transverse movement of the carriage member 54, and then clamping member 110a takes a cope flask section and an associated mold with the mold cavity thereof facing downwardly, and deposits it on top of the drag section, to thereby close the mold and form a complete mold assembly. A more detailed description of the operation of the apparatus of unloading and mold closing station 24 will hereinafter be presented.

*Feed transfer station and associated transfer mechanism thereof*

Figure 15:
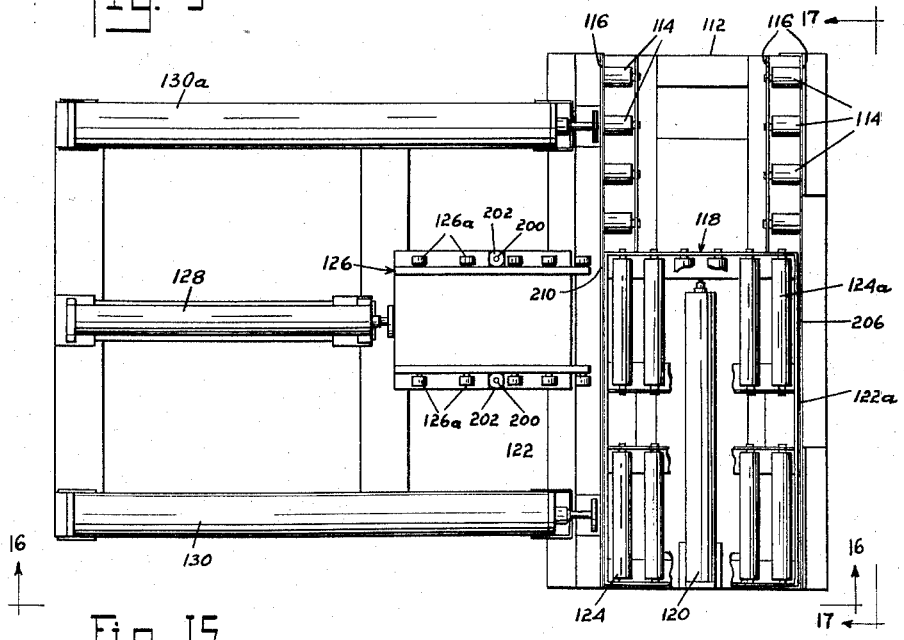
Fig. 15 is an enlarged, horizontal plane view taken substantially along lines 15—15 of Fig. 2 looking in the direction of the arrows and illustrating a transfer station of the apparatus and the triple transfer mechanism for feeding the flask and completed mold assemblies to the feed conveyors of the molding plant apparatus for subsequent pouring operations thereon.
Figure 16:
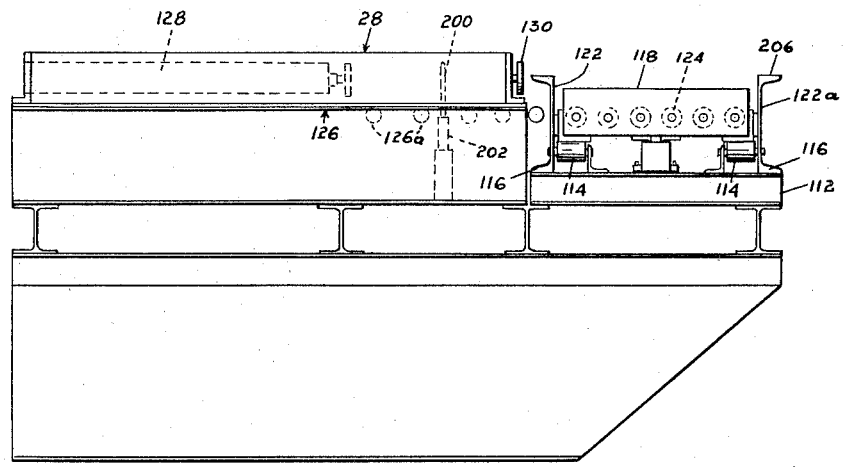
Fig. 16 is a side elevational view taken substantially along line 16—16 of Fig. 15 looking in the direction of the arrows.
Figure 17:
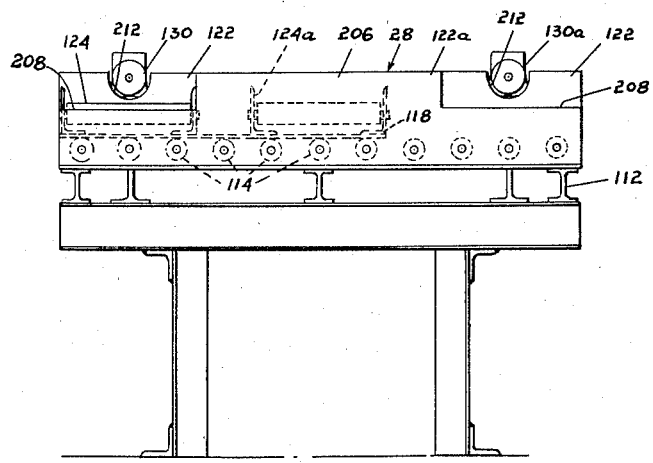
Fig. 17 is an end elevational view taken substantially along line 17—17 of Fig. 15 looking in the direction of the arrows.

Referring now in particular to Figs. 15, 16 and 17, there is shown in detail, the feed transfer station and associated transfer mechanism 28. Transfer mechanism 28 in the embodiment shown, is of the triple acting type (i.e. is adapted to move the complete mold assemblies in alignment with either of the transport mechanism or feed conveyors 30 or 32 and to move the mold assemblies onto such feed conveyors systems). Mechanism 28 comprises a base frame 112 having a plurality of roller members 114 rotatably mounted thereon by means of brackets 116. Supported on rollers 114 is a carriage member 118 actuated for transverse movement with respect to base 112 by fluid actuated, double acting, piston and cylinder unit 120 (Fig. 15), secured at one end to base 112 and at the other end thereof to carriage 118. Thus, upon selective reciprocation the piston element of unit 120, the carriage 118 will be moved along the path of travel defined by rollers 114 and associated guide walls 122, 122a (Fig. 16). Mounted in side-by-side, spaced relationship on carriage 118 and extending in the direction of the feed conveyor systems 30 and 32, are a pair of roller type conveyor sections 124 and 124a. Disposed adjacent to carriage 118 and towards the unloading station 24 is a closure platform or table 126 on which the cope and drag mold sections are asembled by clamping mechanisms 110 and 110a into complete mold assemblies. Platform 126 has rotatable rollers or disks 126a mounted thereon and extending above the plane of the table or frame 126 for movingly supporting the complete mold assemblies thereon. A fluid actuated, double acting, piston and cylinder unit 128 is provided for moving the complete or closed mold assemblies from table 126 to one or the other conveyor sections 124, 124a. Disposed on either side of unit 128 and slightly above the plane of the roller members of conveyor sections 124, 124a (Fig. 17), are a pair of double acting, fluid actuated, piston and cylinder units 130, 130a. Units 130 and 130a are adapted to move the complete mold assemblies from the associated one of conveyor sections 124, 124a onto the respective one of conveyor lines 30, 32 upon alignment of the conveyor sections 124, 124a with the respective one of units 130, 130a, for movement of the mold assemblies to the pouring stations. A more detailed description of the overall operation of the transfer station 28 and associated mechanism thereof will be hereinafter presented in connection with the overall operation of the complete plant arrangement.

Pouring station and associated clamping mechanism thereof

The mold assemblies are moved by the piston and cylinder units 130, 130a of transfer mechanism 28 to one or the other of feed conveyor systems 30 or 32, where the desired number of molds "in train" are clamped by clamping mechanism 36 (Fig. 2), preparatory to the pouring of the molten metal into the mold cavities. In the embodiment shown, the clamping mechanism is manually actuated and moved into clamping position by fluid actuated piston and cylinder units 134 against the resistance to tensioning of spring elements 136. Thus, upon the release of the fluid pressure to units 134, the springs 136 will automatically move the generally flat, plate-like elements 138 of mechanism 36 out of engagement with the tops of the molds assemblies. Molten metal is poured into the usual down sprues of the train of mold assemblies by a pouring crew, and the clamping action of mechanism 36 is retained until the metal has sufficiently solidified.

The length of the feed conveyor systems 30, 32 is generally determined by the cooling time for the metal, which is rather short when the castings are of the thin wall type. As an example, assuming it takes 300 seconds to cool a mold and that the mold blower device 16 produces one complete mold every 15 seconds, each of conveyor lines 30, 32 should be able to carry at least 20 molds for pouring operations.

Mold push out station

Figure 23:
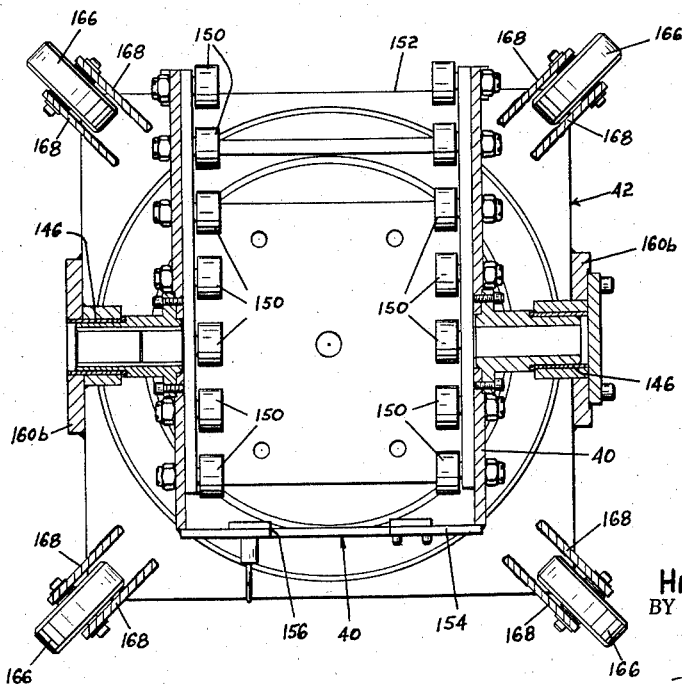
Fig. 23 is a horizontal, sectional plan view taken substantially along line 23—23 of Fig. 19 and illustrating details of the shake-out cage or carriage and elevator or hoist assembly.

The mold push-out station 38 is best illustrated with reference to Figs. 18 to 23 inclusive. The first of the molds in the "train" of poured molds and solidified castings on conveyor systems 30 or 32 is advanced into cage member 40 mounted on elevator structure 42, by the new unpoured molds being fed by the mechanism of transfer station 28 to the feed conveyor system. The first mold entering the push-out station closes a limit switch which in turn closes an electrical circuit which will hereinafter be descrbed in detail and the cage 40 is rotated to an upsidedown position by means of a fluid operated turnover motor unit 140 which is of a well known type. Fluid operated plunger units 142 (Fig. 19) are then automatically actuated and the plungers thereof pass through the spaces between the straps of grid 143 on the bottom of the drag flask section which is now in upper most position, pushing the molding and associated castings out of the flask asembly into tapered chute portion 144 of elevator structure 42, and thence to a conveyor (not shown) for carrying the sand to a reclaiming station and the castings to a cleaning station. As best shown in Fig. 23, the turnover cage 40 is suitable journaled as at 146 for rotatable movement with respect to the elevator mechanism, and comprises a box-like structure (Fig. 25) having an opening 148 in the top wall 148a thereof for passage therethrough of the castings and molding sand when the cage is in an inverted position, and roller elements 150 journaled on cage 40 for supporting the flask and mold assembly thereon. It will be noted that cage 40 is open as at 152 (Fig. 25) at one end thereof, for passage therethrough of the mold assembly from pouring station 36, the other end thereof being substantially closed, as at 154 for providing an abutment wall for retaining the mold assembly in the cage, during rotation of the latter in the direction of the arrow shown in Fig. 18. An opening 156 is preferably provided in an abutment or wall 154 of cage 40 for projection therethrough of the flange portions X (Fig. 18) of the surmounted flask sections, to further aid in retaining the mold assembly in proper position in the cage, during inverting of the latter. Cam actuated, three way valve mechanism 260 (Figs. 20, 24) limits the rotary movement of cage 40 in either direction. In the embodiment of the invention, shown a push-out station and associated elevator mechanism is shown associated with each of the feed conveyor systems 30 and 32, but it will be understood that only one push-out station and associated elevator mechanism could be used for both conveyor systems, the latter arrangement merely slowing up the production rate of the foundry plant.

Elevator mechanism

After the sand and castings have been shoved out of the inverted flask assembly, the elevator mechanism 42 automatically lifts the cage 40 and empty flask assembly upwardly to the transfer station 44, for movement of the flask assembly onto return conveyor system 46. Elevator mechanism 42 includes a generally open sided frame structure or elevator car 160 having a top wall or strap element 160a and a bottom wall 160b, which defines the aforementioned tapered chute portion 144 (Figs. 18 to 21 inclusive). Cage 40 is journaled as at 146, as aforementioned, to side straps 160c of the elevator car 160. Connected to top wall 160a is a fluid actuated piston and cylinder unit 162 mounted at the top of columnar frame structure 164, for moving car 160 and associated cage 40 vertically with respect to structure 164, and thus lift the empty flask assembly to transfer station 44. Mounted adjacent the top and bottom walls 160a and 160b respectively of elevator car structure 160 are a plurality of wheel members 166 suitably journaled to car 160 by bracket members 168. Wheels 166 are adapted to ride in columnar elements 170 which are of V-shape in horizontal cross section (Figs. 19 and 24) of elevator structure 42 and so guide the vertical movement of the elevator car 160 with respect to columnar frame 164. During upward movement of the elevator car structure 160, associated cage 40, and the empty flask assembly, the cage is automatically rotated, by means of motor unit 140, to upright position, thereby once again returning the cope flask section in surmounting relationship to the drag flask section, by the time that the flask assembly reaches the return transfer station 44.

Return transfer station

Figure 24:
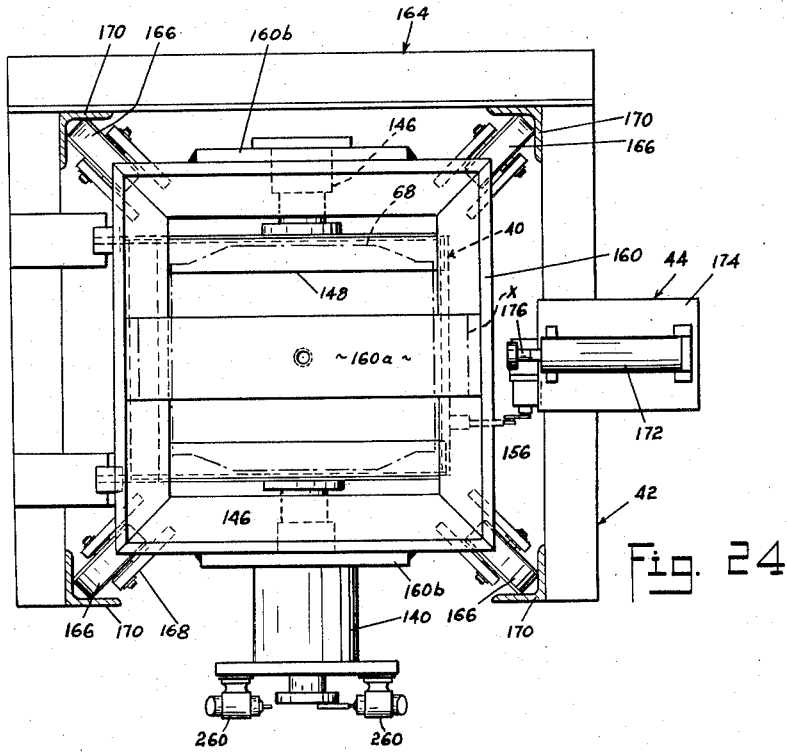
Fig. 24 is a horizontal plane view taken substantially along line 24—24 of Fig. 20 looking in the direction of the arrows and in particular illustrating the transfer mechanism for moving the flask assemblies to the return conveyor system for ultimate return to the loading station.
Figure 25:
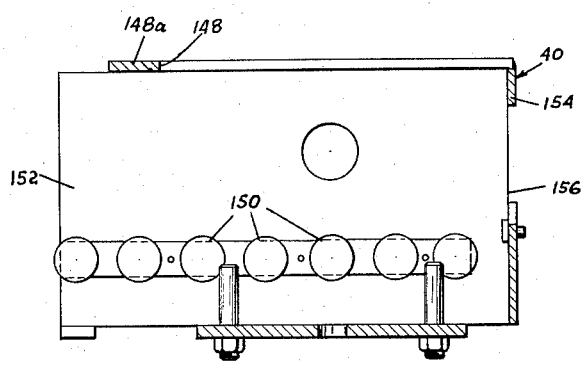
Fig. 25 is a vertical sectional view of the shake-out cage or rotary carriage mechanism of the molding plant arrangement of the invention.

Referring now in particular to Figs. 20 and 24, return transfer station 44 comprises a fluid actuated double acting piston and cylinder element 172 mounted on a shelf 174 connected to elevator frame structure 164 for shoving or pushing the upright empty flask assembly from cage 40 onto the return conveyor system 46. The piston element 176 of unit 172 is adapted to pass through opening 156 in end wall 154 of cage 40, engage the flask, and move it onto the swingable or switch conveyor section 178 (Fig. 1) pivotally mounted as at 180 on the main course of return conveyor system 46. As shown in Fig. 1, pivotally mounted conveyor section 178 is swingable into coacting relationship with either of the pair of transfer stations 44 by any suitable means, such as the fluid operated piston and cylinder unit 182 shown.

Return conveyor system

Referring now in particular to Figs. 1 to 4 inclusive, the return conveyor system 46 comprises a single, generally downward sloping conveyor of preferably the roller type, supported in vertically spaced relationship with respect to feed conveyor systems 30 and 32, by means of a frame work 184. The empty flask assembly (Fig. 2) rolls down the return conveyor until it reaches the aforementioned stop station 48, comprising a movable abutment 186, connected by rocker linkage 187 to fluid operated motor unit 188. The flask assemblies are retained at stop station 48 until they are ready to be received by the loading station 10. From station 48 the empty assemblies are fed in sequence further down the return conveyor 46 to the aforementioned tilt station 50 (Fig. 4), comprising a tiltable table or platform member 190 and abutment 192, and a fluid actuated piston and cylinder unit 194 for tilting the platform 190, to stop the flask assemblies in predetermined position and then level the same. The clamping and transfer mechanism 60, 60a at loading station 10 can thereupon move the cope and drag flask sections, as aforedescribed, from tilt platform 190 to the respective one of the transport mechanisms 12, 14, for progression once again through the plant arrangement.

*General operation*

The general operation of the clamping and transfer mechanism of the loading station 10 will first be described. The piston and cylinder motor unit 56 of loading station 10 is actuated to position the clamping mechanism 60 (Fig. 5) over the empty flask assembly disposed in level position at tilt station 50, and the actuating or lift unit 62 thereof is supplied with fluid pressure, thereby lowering the clamping mechanism. At the same time fluid pressure is introduced into stop units 96 (Fig. 10) thereby moving the stop plungers 96b into the downward path of travel of stop piston 94b (Fig. 10) thereby limiting the downward movement of clamping mechanism 60 into proper straddled relationship with respect to flanges 68 on the cope section of the flask assembly. During such downward movement of clamping mechanism 60, fluid pressure is also supplied to the cylinder units 76 (Fig. 14) of clamping jaws 66 by way of ports 80, thereby permitting passage of the clamping jaws into laterally disposed position on either side of the flask cope section. The fluid pressure is then released from cylinders 76 and the spring members 70 thereof urge the jaws 66 into clamped relation with the flanges 68 on the cope flask section. Clamping unit 60 is then moved upwardly by motor unit 62 and motor unit 56 moves the carriage 54 towards the left (as viewed in Fig. 5) to position the clamped cope flask section over the cope shuttle bar or transport mechanism 14 and to position the clamping mechanism 60a over the drag flask section remaining on the platform 190 of tilt station 50. The vertically moving actuating units 62 for both the clamping mechanisms 60 and 60a are then actuated to move both of the latter downwardly, whereby the cope section is deposited on the shuttle bar mechanism 14 and the clamping mechanism 60a is moved into straddle relationship with the drag section in a manner similar to that described for the clamping action of mechanism 60. As described in the aforementioned co-pending application, Serial No. 622,114, pins are provided on the transport mechanisms 12, 14 for entry into complementary openings in the flask sections, for positioning the latter in predetermined and fixed positions on the associated one of the transport mechanisms.

The clamping jaws 66 on mechanism 60 are then opened or retracted upon the introduction of fluid pressure to the cylinder units 76, and the clamping jaws of mechanism 60a are moved inwardly to clamped position with the flanges 68 on the drag flask section, upon the removal of fluid pressure from its axially actuating cylinders units 76a and the resultant expansion of compression springs 70a thereof. The lifting cylinders 62 thereupon move clamping mechanisms 60 and 60a upwardly lifting the drag flask section off the tilt station 50 and leaving the cope flask section in proper supported position on the shuttle bar mechanism 14. Motor unit 56 then moves the carriage 54 to the right (as viewed in Fig. 5), to position the clamping mechanism 60a and clamped drag flask section over the shuttle bar mechanism 12 and the clamping mechanism 60 over the return tilt station 50. Fluid pressure is then introduced into one of cylinder units 88 on either side of clamping jaws 66 of mechanism 60a, thereby rotating the jaws by means of the rack and pinion structure 86, 84 and inverting the clamped drag flask section. The actuating motor units 62 on both clamping devices 60 and 60a then lower the latter to position the mechanism 60 once again in straddled relation with a cope section of another flask assembly positioned at tilt station 50, while the clamping mechanism 60a deposits the clamped, drag section in proper inverted position on shuttle bar mechanism 12. Fluid pressure is then introduced into the cylinder units 76a of clamping device 60a via ports 80a, thereby releasing the drag flask section from clamped relationship, while the fluid pressure is removed from cylinder units 76 of clamping device 60, thereby permitting the spring elements 70 thereof, to move the clamping jaws 66 of device 60 into clamped relation with the flanges 68 on the cope flask section. The lift cylinders 62 of mechanisms 60 and 60a are then actuated to move the latter upwardly, thereby lifting the clamped, cope flask section from tilt station 50, and then the above described operations are repeated in a continuous manner to continually load the reciprocating transport mechanisms 12 and 14 with empty cope and drag flask section from tilt station 50.

The molds are then blown on molding machines 16, the drag flask sections are inverted to upright position, and the molds are inspected and cored at stations 20 in the aforedescribed manner and as described in connection with the aforementioned co-pending application, Serial No. 622,114, the shuttle bar mechanisms 12 and 14 continually advancing the flask sections and associated molds through the various work stations for work operations thereon and thence to the unloading and closing station 24.

Operation of the mechanism of unloading and closing station 24 is generally similar to that of loading station 10, except that the cope and drag sections of the flasks and associated molds, are unloaded from the shuttle bar mechanisms 12 and 14 and placed in stacked or mold closing relation on table or platform 126 of the transfer station 28, instead of being unloaded from stacked relation and placed on the transport mechanisms, as happens at the loading end of the plant arrangement. Referring in particular to Fig. 9, the carriage 54 of the unloading mechanism is shifted to the left (as viewed in Fig. 9) by means of motor unit 56, until the clamping mechanism 110 is positioned over the discharge end of transport mechanism 12. Lift motor unit 62 is then actuated, thereby causing mechanism 110 to be lowered in straddled relation with the upright, inspected and cored drag section of the flask and associated mold at the discharge end of the shuttle bar mechanism 12. Clamping mechanism 110 and 110a may have similar plunger stop mechanism 96 for precisely and effectively locating the downward vertical movement of the clamping mechanisms in a similar manner as already discussed in connection with the mechanisms of the loading station 10. During downward movement of mechanism 110, the clamping jaws 66 thereof, are retracted or moved outwardly from one another by the admission of fluid pressure into the actuating cylinder units 76 thereof, in a manner similar to that described in connection with the clamping jaws 66 of the loading station mechanism, to thereby permit passage of mechanism 110 into said straddled engagement with the drag flask and mold section. Fluid pressure is then released from cylinder units 76 and the compression spring members 70 therein cause inward movement of the clamping jaws 66 of clamping device 110 into clamping relation with the intermediate side flanges 68 on the drag flask section. Lift unit 62 of mechanism 110 is thereafter actuated to lift the drag flask and mold section vertically off the discharge end of shuttle bar mechanism 12, and the driving motor unit 56 is actuated to move the carriage 54 to the right as viewed in Fig. 9 thereby positioning the drag flask and mold section over the table 126 of transfer station 28, and the clamping mechanism 110a in vertically spaced alignment over a cope flask and mold section on the discharging end of transport mechanism 14. The lift units 62 for both mechanisms 110 and 110a are then actuated to lower the drag flask and mold section onto the platform 126 and the mechanism 110a into straddled engagement with the cope flask and mold section on transport mechanism 14, the stop plunger mechanism 94, 96 and the clamping jaws 66 of mechanism 110a operating in a similar manner as above described in connection with the clamping mechanism 110 to properly position the clamping jaws of mechanism 110a into straddled and aligned relation with the side flanges 68 on the cope flask and mold section. Vertically disposed aligned pins 200 (Figs. 15 and 16), are associated with transfer platform 126 and are adapted to be received in complementary and aligned openings in the side flanges of the cope and drag flask sections to insure positive and proper positioning of the flask and mold sections with respect to platform 126 and with respect to one another. Pins 200 are reciprocable in a vertical direction for engagement and disengagement from the openings in the flask sections, and are actuated by any suitable mechanism, such as by means of fluid actuated units 202.

The clamping jaws 66 of mechanism 110 are then moved outwardly, from clamping relation with the drag flask section positioned on platform 126, by the introduction of fluid pressure into the associated cylinder units 76 thereof, and the clamping jaws 66 of clamping mechanism 110a are moved into clamping relation with flanges 68 on the cope flask and mold section by the removal of fluid pressure from the associated cylinder units 76 thereof, and the resultant expansion of the compression springs 70 therein. The lift units 62 then move the mechanisms 110, 110a upwardly, thereby lifting the cope flask and mold section off transport mechanism 14 while leaving the drag flask and mold section in upwardly facing position on platform 126. The motor unit 56 then moves the carriage 54 to the left (as viewed in Fig. 9) positioning the cope flask and mold section above and in aligned relation with the drag flask and mold section on platform 126, and positioning the clamping mechanism 110 above another drag flask and mold on the discharging end of transport mechanism 12. Motor units 62 are then actuated to lower the cope flask and mold section onto the drag flask and mold section, thereby closing the mold to form a complete mold assembly, and lowering the clamping mechanism 110 into straddled relation with the new drag flask and mold section on transport mechanism 12. The clamping jaws 66 of mechanism 110a are then released from clamping relation with the cope mold section and the clamping jaws 66 of mechanism 110 are moved into clamping relationship with the new drag flask and mold section on transport mechanism 12, and motor units 62 are actuated to repeat the above discussed operations in a manner for the continual unloading of the flask and molds sections from the reciprocating transport mechanisms 12 and 14 and the closing of the mold sections into complete mold assemblies. During downward movement of a cope flask and mold section into surmounting relationship with an associated drag flask and mold section, the aforementioned aligning pins 200 as aforementioned, insure positive alignment and positioning of the mold sections with respect to one another.

The operation of the triple-transfer station and associated mechanism 28 for feeding the completed or closed flask and mold assemblies to the feed conveyor or transport systems 30 and 32 will now be described. Transfer carriage or wagon 118 (Fig. 15) is moved transversely on roller members 114 by means of piston and cylinder motor unit 120 until one or the other of conveyor sections 124, 124a is disposed in longitudinal alignment with a complete mold assembly supported on closure platform or table 126. The aligning pins 200 are then retracted from coacting relation with the flask sections of the complete assembly on table 126 and motor unit 128 is activated to shove or move the mold assembly onto the associated conveyor section 124 or 124a. The piston element of unit 128 is then retracted and the aligning pins 200 moved upwardly preparatory to receiving another drag section and cope section thereon in aligning relationship.

The motor unit 120 is then again actuated to move the wagon 118 and one of the supported conveyor sections 124 or 124a on which the complete mold assembly is positioned, into aligned and coacting relationship with either of the conveyor lines 30 or 32. As will be clearly seen from Fig. 1 of the drawings, conveyor section 124 is adapted to feed complete mold assemblies to conveyor line 30, while conveyor section 124a is adapted to feed complete mold assemblies to conveyor line 32. When motor unit 120 has positioned one of the conveyor sections 124, 124a into coacting alignment with a respective one of conveyor lines 30 or 32, the associated of the cylinder and piston units 130, 130a, is activated to move the mold assembly from the supporting conveyor section 124, 124a onto the associated feed conveyor line 30 or 32. As can be best seen from an inspection of Figs. 16 and 17, the central portion 206 of side wall 122a of frame 112 serves as an abutment for limiting the forward travel of the mold assembly as it is shoved onto one of the conveyor sections 124, 124a from platform 126, while the end portions of wall 122a have been cut down or recessed as at 208 to permit the passage therethrough of the piston element of pusher motor units 130, 130a. Likewise the central portion of wall 122 has been recessed at 210 (Fig. 15) for permitting passage therethrough of a mold assembly from platform 126, and the end portions of such wall have been grooved or mooned out, as at 212 (Fig. 17) for the same reasons as above discussed. It will be seen from inspection of Fig. 15, that it is possible with such a triple-transfer mechanism to feed both conveyor systems 30 and 32 at the same time by moving the carriage 118 in alternate coaction with first one and then the other of the conveyor lines 30 or 32, since conveyor section 124a could be receiving a mold assembly from platform 126 while pusher 130 is discharging a mold assembly from conveyor section 124 onto conveyor line 30, and then shifting the carriage 118 over into coaction with conveyor line 32, wherein conveyor section 124 could be receiving a new mold assembly from closure table 126, while pushing unit 130a was moving the mold assembly on conveyor section 124a onto conveyor line 32, or only one conveyor could be loaded at a time with the carriage 118 merely shifting back and forth into coacting relationship between closure platform 126 and one of the feed conveyor lines, until the latter was filled, and then repeating the operation with the other of the conveyor lines.

While two feed conveyor lines 30 and 32 are shown in side-to-side relation with the latter arrangement saving considerable floor space and facilitating continual pouring operation on two trains of molds, it will be understood that only one feed conveyor or transport line could be used, the latter arrangement merely resulting in a slowing up of the rate of production.

The remainder of the operations especially as concerns the mold ejector mechanism and return conveyor arrangement are believed to have been heretofore described in sufficient detail, and accordingly no further discussion in this connection is believed necessary.

*Operating and control system*

Referring now more particularly to Figs. 27 through 37 there is shown an operating and control system for the foundry plant which can be employed to activate each of the mechanisms and to perform each of the operations hereinbefore described in a predetermined sequence to provide a continuous formation of molds or cores in an automatic cycle. Figs. 27 to 29 diagrammatically illustrate the fluid operating system for the main part of the plant which includes the receipt of an empty flask on the return conveyor and its return to the feed conveyor for filling and pouring. Fig. 30 schematically illustrates an electrical control system which is employed to selectively activate a plurality of solenoid actuated valves in the fluid operating system and which includes various pressure and physically actuated devices and control switches for accomplishing the automatic operation. The detailed operative structure of certain of the valve members and control mechanisms in the operating system are diagrammatically and schematically shown in Figs. 31 through 35 inclusive, each of which includes multiple reference identification where the particular valve or mechanism is duplicated in the system. The mold ejector apparatus which receives the poured flask, ejects the mold and returns the empty flask to the conveyor for refilling is also actuated and controlled by a fluid and an electrical system which are respectively diagrammatically and schematically shown in Figs. 36 and 37 and which are keyed in the automatic cycle with the main operating and control system in a manner to be hereinafter more fully described. The automatic cyclic operation of the plant will be described by collective reference to the overall operating and control system as shown by all of the diagrammatic and schematic illustrations taken in conjunction with each other in the normal sequence of operation.

In operation, the main control switch S (Fig. 30) is closed to supply the necessary operating voltage from the lines L1, and L2 to the control circuit. The voltage is first supplied through a cabinet door switch DS to energize an indicating lamp L and, when the push-start button B is closed, it energizes a relay coil CR18 through a series of emergency stop switches, indicated generally at E and closes the relay holding the line contact R18 which apply voltage from L1 and L2 to various branches of the control circuit. Manual activation of any one of the emergency stop buttons E will de-energize the coil CR18 to open the relay line and holding contacts. The remaining portion of the control circuit includes three parallel branches, one of which is controlled by a "loading" step-switch, another by an "unloading" step-switch, and a third branch is controlled by a "transfer" step-switch. For ease of description, the step-switches are schematically shown by their contacts and their operation is diagrammatically illustrated in a chart adjacent each branch.

For full automatic operation, and assuming that a cope flask is removed from the discharge end of the return conveyor 46, leaving only a drag flask to be picked up for loading; the first operation is to set the "loading" step-switch to the Number 1 position. This closes step-switch contact S2 which energizes the valve solenoids X3 and X5. These solenoids operate the corresponding valves which respectively position the carriage 54 and also extends the drag stop 96b and retracts the cope stop 96b. Simultaneously with application of the control voltage to the circuit, pressure switch PS8, which is normally closed, applies the voltage to relay coil CR5 which closes relay contact R5 in series with step-switch No. 1. The drag flask on the return conveyor 46 will operate to close limit switch LS1 and energize relay coil CR19 in the "transfer" branch of the circuit, which in turn closes the contact R19, also in series with "loading" step-switch No. 1. At this point, the cope shuttle bar 14 is in receiving position and pressure switch PS1 closes to energize the relay coil CR13 in the "unloading" branch of the control circuit which in turn closes the relay contact R13, also in series with "loading" step-switch No. 1. Since relays R5, R13 and R19 are closed, the "loading" step-switch now automatically moves to step No. 2 to open step-switch contact S2, thereby deenergizing valve control solenoids X3 and X5 previously energized by activation of step-switch contact S2.

The step-switch continues to operate and close step-switch contact S3 to energize the loading lift solenoid X29 which causes the drag lift mechanism 60a to lower into the drag pickup position towards the return conveyor until it is stopped by the drag stop pin 96b, and also causes the cope lift mechanism 60 to move into cope delivery position towards the cope shuttle bar 14. When the lift mechanism 60a is lowered down into the drag pick-up position pressure switch PS9 is closed and moves the step-switch into step No. 3, which closes step-switch contact S4 to energize solenoid X1 which activates the corresponding valve to close the drag clamp 76a and to open the cope clamp 76 thereby closing in upon the drag section of the flask and releasing the cope section. At this point, pressure switch PS27 closes and causes the step-switch to move into step 4. This opens step-switch contacts S3 and S4 to de-energize the solenoids X29 and X1, which in turn activate the corresponding control valves in the fluid operating system to cause the drag and cope flask lifts 60a and 60 to raise thereby lifting the drag section away from the conveyor and leaving the cope section on the cope shuttle bar 14.

When the lift mechanism is in the raised position, the pressure switch PS28 closes to energize relay coil CR1 thereby closing relay contacts R1 in series with the step-switch No. 4 to move the step-switch into step No. 5 and to close step-switch contact S5 and thereby energize solenoids X4 and X6, provided there is no drag flask remaining on the shuttle bar, thereby leaving limit switch LS2 open. This causes the carriage 54 to move into the drag "delivery" and the cope "pick-up" position and the cope stop-pin 96b is moved in while the drag stop pin 96b is retracted. When the carriage 54 attains the drag deliver position, pressure switch PS10 is closed to energize relay coil CR8 and thereby close relay contact R8, move the step-switch into step No. 6. This causes step-switch contact S6 to close and thereby energize the coil CSR1 which in turn opens the SR1 contact and closes the SR2 contact, thereby respectively energizing the solenoid coil X7 and deenergizing the solenoid coil X8. Energization of solenoid coil X7 activates the corresponding valve in the fluid operating system to turn over the drag section. So long as there is a flask on the return conveyor, the relay contact R19 remains closed and, when the drag shuttle bar 12 is in the receiving position and pressure switch PS30 remains closed, relay coil CR11 will maintain relay contact R11 closed to activate the timer T1; the R19 contact in series with T1 being a second contact of the relay R19.

After the lapse of a predetermined time, which, in the arrangement shown, approximates one second, the timer contacts ST1 close to move the step-switch into step No. 7. The arrangement is such that in step No. 7, step-switch S3 is again closed and solenoid X29 is energized to activate the corresponding valve to cause the drag and cope lift 60a and 60 to go down and respectively to deliver a drag section (now turned over) and to pick-up a cope section. As before, when the drag and cope lifts are down, pressure switch PS9 closes and causes the step-switch to move into step 8. Now step-switch S7 closes and energizes the solenoid X2 to activate the corresponding valves for releasing the drag clamps and causing them to close in on the cope flask. This operation activates the pressure switch PS7 which closes and causes the step-switch to move into step No. 9.

In step No. 9, the step-switch S3 is opened, thereby deenergizing the solenoid X29 to permit both lifts to travel upwardly, thereby closing pressure PS28 to energize relay coil CR1 and opening relay contact R1 which, in the arrangement of the step-switch shown, causes the step-switch to return to step No. 1. The switch back to step No. 1 will occur unless there is still a cope flask on the shuttle bar so that the shuttle bar is not ready to receive the next flask section. In the latter case, limit switch LS3 is open, thereby preventing the step-switch from returning to step No. 1. When the step-switch is returned to step No. 1, the carriage 54 is moved back to pick up another drag section from the conveyor and to deliver the cope section to the cope shuttle bar by energizing the solenoid X3, and energization of X5, causes the drag stop 96b to be expanded and the cope stop 96b to be retracted.

The shuttle bar transfer mechanism for each of the drag and cope flask sections operates to transfer the drag and cope flasks from the respective loading to the respective blowing stations. The drag shuttle bar 12 is moved forward when solenoid X15 is momentarily energized, while the cope shuttle bar 14 is moved forward by momentary energization of the solenoid X25. It will be noted that energization of each of the solenoids is dependent upon closure of a plurality of limit switches in series in each of the respective "loading" and "unloading" branch circuits. Thus, if no flasks are loaded on the corresponding shuttle bars, the limit switches LS4 and LS5 in the respective circuits are open and prevent movement of the empty shuttle bars. These limit switches are open again as soon as the shuttle bars carry the flasks away. In addition, the clamping tables of the drag and cope mold blower apparatus 16 must be down and ready to receive the incoming empty flasks, thereby closing the other limit switches LS6 and LS7. Also the lifts on the loading and the unloading side must be raised in order that pressure switches PS28 and PS35 in the "loading" and "unloading" branch circuits respectively are closed to energize the corresponding relays CR1 and CR6. Relays CR5 and CR17 are energized respectively by pressure switches PS8 and PS16 in the corresponding "loading" and "unloading" circuits, which in turn close the relay contacts R5 and R17 when the loading and closing carriages 54 move away from the drag shuttle bar 12. Relays CR8 and CR10 are closed by activation of the pressure switches PS10 and PS18 respectively in the "loading" and "unloading" circuits when the loading and closing carriages move away from the cope shuttle bar 14. Thus, when any of the carriages are respectively over their corresponding shuttle bars, the lifts are in the raised position, but, when the carriages are away from their shuttle bars, the lifts may be up or down. Relay switch contact R12 ("unloading" circuit) for the drag shuttle bar 12 is closed when the shuttle bar is in the receiving position, the drag turn-over 18 is down, the core-set machine 20 is down, and the drag turnover clamps 76a are open. Similarly, the relay contact R15 for the cope shuttle bar 14 is closed when the shuttle bar is in receiving position. When the drag shuttle bar 12 is in the delivering position, the pressure switch PS29 closes energizing relay R2, and when the pouring clamps 36 are raised, the pressure switch PS22 opens to deenergize relay coil CR4, thereby closing relay contacts R4 in both the "loading" and "unloading" circuits. As soon as the relay contacts R2 and R4 are closed in both the "loading" and "unloading" circuits, the drag mold blowing clamp timer DCT is energized and will operate to close internal timer contacts which energize the solenoid X30 and table clamp solenoid X40. Activation of the gate solenoid X50 closes the sand fill opening of the blow head on the blowing apparatus 16 and the table raises to pick up the drag flask, thereby lifting it away from the shuttle bar 12 and up against the blow head. When the pressure in the base of the drag mold blower reaches approximately 100 p.s.i. (line pressure) and the table is in clamping position, pressure switch PS15 closes and after the gate has closed the sand fill opening of the blow head, thereby closing pressure switch PS14, solenoid X31 is energized and the clamping pressure, which presses the table against the blow head, rises from 100 p.s.i. (line pressure) to approximately 500 p.s.i., thereby securing a safe clamping of the flask with protection against expansion and explosion.

At the same time, a toggle switch TG1, which is normally closed, causes the drag pre-fill timer DPT to close and energize solenoid X41 to start the filling of the flask with low air pressure. After approximately one second of time elapse, the drag pre-fill timer DPT causes internal contacts to be opened to deenergize the solenoid X41 and to energize the blow timer BT, provided that booster pressure switch PS33 registers at 500 p.s.i. Energization of the blow timer BT closes internal contacts and energizes the drag blow solenoid X32 and, after, approximately one second of time elapse, the internal contacts of the blow timer BT are opened and other contacts closed to deenergize the blow solenoid X32 and to energize the drag squeeze timer DST, which, in turn, energizes the drag squeeze solenoid X42. The drag squeeze timer DST is also deenergized after one second of time elapse to deenergize the squeeze solenoid X42. The returning squeeze piston draws the pattern and at this point, the drag clamp timer DCT which kept the table in clamp position during pre-filling, blowing, squeezing and drawing, will be deenergized to permit the pre-fill, blow and squeeze timers to reset.

During the time that the drag clamp timer DCT is energized and pressure switch PS15 is closed, solenoid X16 will be energized to return the shuttle bar 12 to the receiving position. Of course, relay contacts R9 and mold limit switch LS8 are closed and either relays R17 and R1 or R17 and R5, or R6 and R5, or R6 and R1 are closed. These relays will operate to control the shuttle bar return in such a way that the lift has to be up when the carriage 54 is over the shuttle bar or that the carriage has to be out when the lift is down to avoid collision. Relay CR9 is energized when pressure PS12 (the turnover and core-set being up) is closed and when the relay contacts R2 are closed upon energization of the pressure switch PS29.

It will be apparent that as soon as the shuttle bar 12 moves back into receiving position, the pressure switch PS29 opens to deenergize the relay CR2 and to deenergize and open the relay CR9, thereby deenergizing solenoid X16. This will cause no difficulty, however, since the solenoid X16 needs to be energized only momentarily.

When the table of the drag mold blower is lowered, the completed drag mold is set down on the returned shuttle bar 12, and, after the shuttle bar has moved forward, the pressure switch PS29 again closes to energize relay CR2, thereby energizing the clamp solenoid X9 at the drag turnover station. The clamps 76a close in on the drag mold and pressure switch PS11 closes to energize solenoid X11 to lift the drag turnover and the core set station, thereby picking up the drag mold and lifting it by the clamps into turn-over position. Pressure switch PS12 closes when the turnover piston and the core-set 20 is all the way up and either the solenoid X13 or X14 will be energized, and the drag mold turned over. At the same time, relay CR9 is energized. It should also be noted that the ratchet relay CSR2, is energized whenever R2 is closed and this will alternately open one of the contacts SR2 to turn the drag mold one way or the other.

When relay CR9 is energized and limit switch LS8 is closed, and the relay contacts in series with the solenoid X16 are closed, the shuttle bar 12 returns and pressure switch PS30 closes to energize relay R11, thereby energizing solenoid X13 to lower the turnover and the core set devices. When the shuttle bar 12 leaves the delivered position, the pressure switch PS29 opens to deenergize the relay CR2, thereby deenergizing solenoid X11 which lifts the drag turnover and the core set. Then, pressure switch PS31 closes, energizing solenoid X10 to open the turnover clamps 76a. Pressure switch PS31 then closes and energizes relay CR12, thereby preparing the shuttle bar 12 to go forward again delivering the turned drag mold into the core set station and, from there, at the next move forward, into the closing station.

By setting the step-switch of the "unloading" circuit to step No. 9, it closes step-switch contact S8 and energizes the solenoid X20 and X22, so that the drag lift (unloading end) will be moved over the shuttle bar 12 and the cope lift 110a over the closing station and the stops 96 are moved in to stop the drag lift at shuttle bar height. Then, pressure switch PS18 closes, energizing relay R10 to move the step-switch over to step 9. In step 9, step-switch S9 closes to energize the lift solenoid X33 and the drag lift will come down to pick up the drag mold from the shuttle bar 12 and to deliver the cope mold to the closing station 126. Pressure switch PS17 then closes returning the step-switch to step No. 1.

In the step No. 1, the unloading and closing mechanism 24 remains until limit switch LS10 is contacted by an outcoming drag mold. Thereafter, the step-switch is moved over into step No. 2. This causes step-switch S10 to close and energizes solenoid X18 so that the clamps 76 close in on the drag mold. At the same time, relay CR7 is energized. At this point, pressure switch PS34 closes to move the step-switch over to step No. 3 in which position step-switch contact S9 opens to deenergize solenoid X33 and the drag lift 110 goes up with the drag mold. When the lift 110 is raised up, the pressure switch PS35 closes, energizing the relays CR6 and moving the step-switch over to step No. 4. In step No. 4, step-switch contact S11 closes to energize solenoid X19 and X21 and the unloading carriage 54 moves the drag mold into the closing station and withdraws the cope and drag stops 96. As soon as the carriage with the drag mold is in the closing position, the pressure switch PS16 closes and relay CR17 is energized and, if the other safety switches are closed, the step-switch is moved to step No. 5. In step No. 5, the step-switch S9 is again closed and energizes solenoid X33 and the lift 110, with the drag mold, goes down into closing position. At this point, pressure switch PS17 is closed and the step-switch moves into step No. 6. In step 6, the step-switch S12 closes to energize solenoid X17 which causes the clamps 76 holding the drag mold to open and pressure switch PS36 to close, thereby moving the step-switch into step No. 7. In step 7, the step-switches S12 and S9 open and solenoid X17 and X33 are deenergized and the lift (without the drag mold) goes up again until pressure switch PS35 closes, thereby energizing relay CR6 and switching the step-switch over into step No. 8. In step No. 8, the unloading carriage 54 moves over towards the shuttle bar when step-switch contacts S8 and solenoid X20 and X22 are again energized, after which pressure switch PS18 is activated to energize CR10 and to move the step-switch over to step No. 9. In step No. 9, step-switch S9 closes and energizes solenoid X33 and the lift 110 goes down again until the pressure switch PS17 closes and the step-switch is returned back to step No. 1. At this point, limit switch LS10 will be closed by another drag mold which again moves the step-switch into step No. 2 to begin another cycle of operation.

At step 7, when the drag mold lift 110 goes up without the drag, the cope mold lift 110a carries a cope mold away from the cope shuttle bar 14 and at step 8, the carriage will move over and carry the cope mold over the closing station 126. Then, at step 9, it will lower the cope mold down onto the drag mold. At the same time, the drag mold lift 110 approaches another drag mold resting on the shuttle bar 12. At step 4, when the unloading carriage moves the drag mold over to the closing station, the cope lift 110a will move over the cope shuttle bar 14, ready to pick up another cope mold. The operation and control of the cope mold blower follows the same pattern as the drag mold blower 16 and the operation described in connection with the latter is equally applicable to the former.

At step 3 when the clamps 76 have released the cope mold, the relay CR7 is energized to close contact R7 in the transfer portion of the circuit and, since the mold limit switch LS12 had been previously closed in step 6 and the relay contact R4 was previously closed by pressure switch PS22, the step-switch in the transfer portion of the control circuit goes into action and moves over to step 2.

At step 2 in the transfer circuit, step-switch contact S15 closes and energizes solenoid X37 and relay CR14. The solenoid X37 retracts the locating pins 202 at the closing station and energization of the relay CR14 prevents the lift 110 from carrying the drag into the closing station. With the locating pins 202 down or in the lowered position, pressure switch PS24 closes and the step-switch moves over to step No. 3. In step 3, contacts S16 are closed to energize solenoid X38, and the main pusher piston 128 moves the mold from the closing station 126 to the transfer wagon 118. Then, pressure switch PS5 closes and the step-switch moves over to step 4. In step 4, the main pusher piston 128 returns by virtue of the opening of S16 and deenergization of the solenoid X38. At the same time, step-switch contact S17 is closed and solenoid X27 is energized to move the transfer wagon 118 over to either of the conveyors 30 or 32. The return of the main pusher piston 128 will cause pressure PS37 to actuate and permit the step-switch to move from step 4 to step 5. When the transfer wagon 118 is positioned opposite one of the conveyors 30 or 32, the pressure switch PS25 closes and, provided relay R101 and R102 are closed, step-switch moves over to step 5. In step 5, the contacts S18 are closed and an hydraulic pusher 130 or 130a moves the mold off the transfer wagon 118 onto one of the conveyors thereby pushing the preceding row of molds towards the mold ejector station. When the hydraulic pusher 130 or 130a is extended, the pressure switch PS6 closes to move the step-switch into step 6. In step 6, the hydraulic pusher is retracted and opens step-switch contact S18 and deenergizes the solenoid X39. When the hydraulic pusher is retracted, pressure switch PS26 closes and the step-switch returns to step 1. In step 1, the transfer wagon 118 returns after step-switch contact S17 opens, solenoid X27 is deenergized, step-switch contact S19 is closed, and solenoid X28 is energized.

Referring now to the mold ejector apparatus which receives a completed mold, ejects the casting and sand and then returns the empty flasks to the return conveyor 46, the control and operating systems are shown respectively in Figs. 36 and 37. It will be seen that there is an operating and control circuit for each side. Thus, by reference to the previous description and drawings, it is apparent that there are two lines of molds being fed from the mold forming apparatus one line being idle while the other is being poured. In the following description, reference will be made to the operation of only one side 30.

A completed mold entering the ejector cage 40 from the conveyor 30 closes the limit switch LS103 and, the relay R102 is closed. This causes the step-switch in the control circuit to move from step 1 to step 2. In step 2, the "turnover" solenoid X107 is energized and the "turnback" solenoid X108 is deenergized, thereby causing the cage 40 to turn over. The mold, being in the cage, is carried over with the cage with the grid 143 on the drag section of the flask being uppermost. When the turnover operation is completed, pressure switch PS8 closes and the step-switch moves into step 3. In step 3, the sand pusher solenoid X14 and the timer T102 are energized and the sand and castings are pushed out of the flasks into a suitable container or onto a conveyor for removal to a cleaning room and sand reconditioning plant.

After the lapse of a predetermined period of time, the timer times out and the step-switch moves into step 4. In step 4, the "turnover" solenoid X107 and solenoid X110, as well as solenoid X114, are deenergized and solenoid X108 and solenoid X109 are energized. This will cause the elevator 160 to travel upwardly and the flask to turn back to its normal position with the grid on the bottom. At the same time, the pusher 142 is withdrawn. Following completion of these operations, pressure switches PS9, PS10, and PS12 close and, assuming that pressure switch PS14 is also closed, the step-switch moves into step 5.

In step 5, the solenoid X112 is deenergized and solenoid X111 is energized. The flask is thus pushed onto the return conveyor 46. When the empty flask, after leaving the pushout station, passes a limit switch LS102, the step-switch moves to step 6. In step 6, solenoid X112 is energized and solenoid X111 is energized and the pusher 142 is withdrawn so that pressure switch PS13 is closed and the step-switch returns to step 1. In step 1, the elevator solenoid X109 is deenergized and solenoid X110 is energized, whereby the elevator 160 travels downwardly into mold receiving position. Then pressure switch PS11 closes to energize the relay CR102 in the manner hereinbefore described.

Referring now more particularly to the graphic representation in Fig. 38 of the drawings, the chart represents in clock-wise direction the operations that take place in a fifteen second cycle. On the chart the alphabetical letters represent the following mechanisms and operation of the apparatus:

A—Loading apparatus
B—Drag shuttle bar
C—Cope shuttle bar
D—Drag mold blower
E—Drag mold blower gate
F—Cope mold blower
G—Cope mold blower gate
H—Drag and cope stop on loading mechanism
I—Turnover mechanism for drag mold
J—Core setting mechanism
K—Closing mechanism
L—Drag and cope stops on closing mechanism
M—Unloading and closing station
N—Triple transfer mechanism
O—Mold ejector apparatus In describing the graphical representation of the timed cycle of operation of the apparatus as shown in Fig. 38 of drawings reference will first be made to the operation of the loading mechanism designated by the capital letter (A) on the outer circle. During the first two second interval, the drag lift 60a is down without a drag flask and the cope lift 60 is down with a cope flask. During next time interval of one second the drag clamp 76a closes and the cope clamp 76 opens. Thereafter, in the next interval of timed two seconds, the drag lift 60a is raised with drag flask and the cope lift 60 is raised without the cope flask. In the interval from five to seven seconds, the carriage 54 moves the drag flask to the drag shuttle bar 12 and thereafter, from seven to eight seconds, the drag flask is turned over. In the interval from eight to ten seconds, the drag lift 60a is lowered down with the drag flask and the cope lift 60 is lowered down without any cope flask. From ten to eleven seconds, the drag clamp 76a opens and the cope clamp 76 closes. From eleven to thirteen seconds, the drag lift 60a is raised without a drag flask and the cope lift 60 is raised with a cope flask. From thirteen to fifteen seconds the carriage 54 moves the cope flask to the cope shuttle bar 14.

Referring now to the operation of the drag shuttle bar 12 as designated by the letter B on the next largest circle, the shuttle bar 12 is idle in the first two seconds of operation. From two to four seconds, the drag shuttle bar 12 is positioned from delivery to flask receiving position. Thereafter, it remains idle until the thirteenth second when the drag shuttle bar 12 is positioned from receiving to delivery position.

Referring now to the circle designated by the letter C, the operation of the cope shuttle bar 14 is shown idle during the first five seconds of operation. However, from five to approximately seven and one-half seconds, the cope shuttle bar is positioned from the receiving to delivery position. It then remains idle until approximately nine and one-half seconds at which time it is positioned from delivery to receiving position.

Referring now to circle designated by the letter D, it is seen that during the first two seconds of operation the drag mold blower table is raised up. Thereafter, between the second and third second of operation, the drag mold blower is pre-filled. In the fourth second, the drag mold is blown; and in the fifth second squeezed; and in the sixth and seventh seconds, the squeeze is returned and the drag flash drawn. Thereafter, from the seventh to the tenth second of operation the drag mold blower table is lowered down.

Referring now to the circle designated by the letter E, the drag mold blower gate is closed during the first two seconds of operation. In the third second of operation, the drag booster pressure builds up and the gate remains closed until the seventh second when the drag mold blower gate opens. From the ninth second until the end of the cycle, the drag mold blower head is filling with sand.

Referring now to the circle designated by the letter F, during the first two and one-half seconds of operation the cope mold blower table is lowered down. This table remains down until approximately seven and one-half seconds have elapsed, after which the cope blower table is raised. After nine and one-half seconds, the cope mold blower is pre-filled, and after ten and one-half seconds the cope mold is blown with sand. From approximately eleven and one-half to twelve and one-half seconds, the cope mold is squeezed, and from approximately twelve and one-half to fourteen and one-half seconds, the squeeze is returned and the cope is drawn.

Referring now to the circle designated by the letter G, the cope mold blower gate remains open from the previous cycle for approximately one-half second and continues open until one-half second of time has elasped. After one and one-half seconds, the cope mold blower is filled with sand until approximately seven and one-half seconds has elasped, after which the cope mold blower gate closes and remains closed until and during booster pressure which is applied at about nine and one-half seconds. The booster pressure stays on until ten and one-half seconds have elasped. The cope mold blower gate remains closed during the remainder of the cycle until about fourteen and one-half seconds have elasped, at which time it is opened.

Referring now to the circle designated by the letter H, which represents operation of the drag and cope stops 96 on the loading mechanism, these stops are idle until five seconds of time have elasped, after which time the cope stop is extended and the drag stop is withdrawn. This operation consumes one second of time in the cycle and the stops stay in position until thirteen seconds of time have elasped, after which they are again actuated and the cope stop is withdrawn and the drag stop is extended; the operation again consuming approximately one second of time in the cycle.

Referring to the circle designated by the letter I, the turnover mechanism 18 has turnover clamps 76a extended into engagement with a flask during the first second and then, the turnover mechanism lifts the flask upwardly in the next second and in the third second the drag mold is turned over. In the fifth second, the turnover mechanism lowers the flask down and in the sixth second the turnover clamps are withdrawn and disengaged from the flask.

Referring now to the circle designated by the letter J, the core set mechanism 20 is raised after the first second and the cores are inserted in the next two seconds. Then the core set mechanism 20 is lowered in the fifth second of operation.

Reference is now made to the circle designated by the letter K, which shows that in the first second and one-half of operation the drag clamp closes and the cope clamp opens on the unloading and closing mechanism 24. After one and one-half seconds the mold is lifted and the carriage 54 positions the drag flask to the closing station 126 and positions the cope lift 110a over the cope mold. After five and one-half seconds, the drag lift 110 moves down to deposit the drag mold. Then, after seven and one-half seconds, the cope clamp closes and the drag clamp opens. After nine seconds, the lifts 110 and 110a are raised and, in the eleventh and twelfth seconds, the carriage 54 returns to the closing station 126 and the drag lift 110 moves to pick up a drag flask. In the thirteenth and fourteenth seconds, the lifts 110 and 110a are lowered.

Reference is made to the circle designated by the letter L, which represents the operation of the drag and cope stops on the unloading and closing mechanism 24. These stops are operated so that after about three and one-half seconds the cope stop is extended and the drag stop is withdrawn. The respective stops stay in this position until after approximately eleven seconds of operation at which time the drag stop is extended and the cope stop is withdrawn.

Referring now to the circle designated by the letter M, which represents the operation of the unloading and closing station for the cope side of the plant, this station does not operate until after seven and one-half seconds at which time two cope molds are lifted and then, after twelve seconds, the cope molds are lowered onto the drag molds.

Referring to the circle designated by the letter N, the triple transfer mechanism 28 begins operating after about two and one-half seconds, at which point in the cycle it receives a completed mold. After the fourth second of operation, the transfer wagon 118 is shifted and, in the sixth second, the completed mold is loaded onto one of the conveyors 30 or 32. In the tenth second, hydraulic pusher 128 is returned and in the twelfth second the transfer wagon 118 is returned.

Reference is made now to the circle designated by the letter O, which refers to the operation of the mold ejector mechanism. At the initial point of operation, an empty flask assembly is returned to the conveyor 46 and, after the first second, the piston 176 is retracted. In the next second of operation, the elevator 160 is lowered down. Thereafter, in the seventh second, a poured mold is passed into the ejector cage 40 and, after the ninth second, the cage turns over and the sand and castings are ejected from the flasks. In the twelfth second, the elevator 160 is raised and cage 40 is rotated back from its inverted position.

The terms and expressions which have been employed are used as terms of description and not of limitation, and there is no intention in the use of such terms and expressions of excluding any equivalents of any of the features described or portions thereof, but it is recognized that various modifications are possible within the scope of the invention claimed.

I claim:

1. In a foundry plant adapted for the continuous handling of flasks and the mass-production of sand molds and associated castings therefrom, a flask loading mechanism, a mold forming station adapted to receive empty flasks from said loading mechanism and form mold cope and drag sections therein, said station comprising a sand blowing mechanism for forming the mold sections and a flask lifting mechanism for moving the mold sections to a position where inspection and coreing can occur, mold closing mechanism for assembling said mold sections into a complete mold assembly, transport means for moving said flask and mold sections in a step-by-step fashion through said station and mechanisms where the related work operations are performed thereon, a mold feed conveyor mechanism for moving the mold assemblies to a pouring station for pouring operations, mold transfer mechanism for moving the mold assemblies from said mold closing mechanism to said feed conveyor mechanism, a mold discharge station for emptying the flasks of solidified castings and mold sand, elevator means for moving the empty flasks from the discharge station to a plane in vertically spaced relationship therewith, and a return conveyor mechanism for moving the empty flasks, from said vertically spaced plane to said loading mechanism.

2. In a foundry plant the combination set forth in claim 1, wherein said flask loading mechanism includes means for inverting the drag flask section for forming of the mold cavity therein by said sand blowing mechanism when the drag flask section is in upside down position.

3. In a foundry plant the combination set forth in claim 2, wherein said mold forming station includes a flask turnover mechanism for inverting the drag section of the flask and associated mold after the mold blowing operation by said sand blowing mechanism to position the mold cavity in the drag flask section in upwardly facing condition.

4. In a foundry plant the combination set forth in claim 1, wherein said feed conveyor mechanism comprises a pair of roller-type conveyor units disposed in side-by-side generally parallel extending relationship and being adapted to alternately receive a plurality of complete mold assemblies from said transfer mechanism.

5. In a foundry plant the combination set forth in claim 4, wherein said transfer mechanism is in the form of a movable wagon, adapted to support the mold assemblies thereon and to be shifted laterally with respect to said mold closing mechanism into coacting relation with one or the other of said feed conveyor units, and means for shifting said wagon into said coacting relation.

6. In a foundry plant the combination set forth in claim 5, wherein each of said feed conveyor units has a discharge station associated therewith for receiving poured molds and associated solidified castings therefrom for discharge thereof.

7. In a foundry plant the combination set forth in claim 6, wherein each of said discharge stations has elevator means associated therewith for moving the empty flasks from the respective discharge stations to a plane in vertically spaced relationship therewith, and means associated with each of said elevator means for moving the empty flasks from the respective elevator means to said return conveyor unit.

8. In a plant for the manufacture of metal castings, a flask loading mechanism, a mold forming station including cope molding means and drag molding means disposed in generally side-by-side relation for the simultaneous production of mold cope and drag sections, transport mechanism for carrying the flask and mold sections through the mold forming station in step like fashion for the performance of various work operations thereon in the production of cope and drag mold sections, an unloading and mold closing mechanism for removing the finished cope and drag mold sections from the said transport mechanism and assembling them into complete mold assemblies, a pair of feed transport mechanisms disposed in generally side-by-side parallel extending relationship, a feed transfer mechanism for moving the complete mold assemblies to one or the other of said feed transport mechanisms, a pouring station disposed along the path of travel of said feed transport mechanisms for introducing molten metal into the mold cavities, a discharge station at the end of each of said feed transport mechanisms for receiving the poured molds and associated solidified castings and discharging the latter from the flask assembly, means for moving the empty flask assemblies from said discharge stations to a position in generally vertically spaced relation to the discharge stations, return transfer mechanism for moving the empty flask assemblies onto a return transport mechanism, the latter being adapted to return the empty flask assemblies to the loading mechanism for reprogression through the plant.

9. In a plant the combination set forth in claim 8, wherein said flask loading mechanism comprises a carriage movable transversely between said cope and drag molding means and into coaction with said return transport mechanism for placing the empty cope and drag flask sections from said return transport mechanism in proper position for coaction with respectively said cope and drag molding means, said carriage member carrying at least one vertically reciprocable clamping device thereon for raising and lowering said cope and drag flask sections in their desired movement from said return transport mechanism to said first mentioned transport mechanism.

10. In a plant the combination set forth in claim 9, wherein said clamping device is of generally inverted U-shaped configuration having transversely reciprocable clamping jaws disposed adjacent the free-ends of said U configuration for clamping the flask sections, and fluid operated means coacting with said jaws to reciprocate the latter into clamping and unclamping positions.

11. In a plant the combination set forth in claim 10, wherein a plurality of said clamping devices are positioned for vertical movement on said carriage member, one of said devices being adapted for loading the cope flask sections onto said first mentioned transport mechanism and another of said clamping devices being adapted for loading drag flask sections onto said first mentioned transport mechanism.

12. In a plant the combination set forth in claim 8, wherein said flask unloading and mold closing mechanism comprises a carriage member movable transversely with respect to said cope and drag molding means, and having at least one vertically reciprocable clamping device mounted thereon, said clamping device being adapted to assemble a cope mold section in surmounting relationship on an associated drag mold section to form a complete mold assembly.

References Cited in the file of this patent

UNITED STATES PATENTS

| | | |
|---|---|---|
| 2,068,835 | Wurster | Jan. 26, 1937 |
| 2,680,270 | Gedris | June 8, 1954 |
| 2,695,432 | Young | Nov. 30, 1954 |
| 2,745,555 | Young | July 17, 1956 |
| 2,767,865 | Lasater et al. | Oct. 23, 1956 |
| 2,782,471 | Mathisen | Feb. 26, 1957 |
| 2,798,267 | Anderson | July 9, 1957 |
| 2,825,103 | Segur | Mar. 4, 1958 |
| 2,842,819 | Granath | July 15, 1958 |